US012583384B2

(12) United States Patent
Hong et al.

(10) Patent No.: US 12,583,384 B2
(45) Date of Patent: Mar. 24, 2026

(54) SYSTEM AND METHOD FOR CONTROLLING A VEHICLE CONDITION CHECK LIGHT USING A DWL MODE

(71) Applicants: HYUNDAI MOTOR COMPANY, Seoul (KR); KIA CORPORATION, Seoul (KR)

(72) Inventors: Seung-Pyo Hong, Incheon (KR); Dong-Hoon Choo, Gwacheon-si (KR); Su-Hak Gwon, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 66 days.

(21) Appl. No.: 18/409,479

(22) Filed: Jan. 10, 2024

(65) Prior Publication Data

US 2025/0091509 A1    Mar. 20, 2025

(30) Foreign Application Priority Data

Sep. 15, 2023    (KR) ........................ 10-2023-0123273

(51) Int. Cl.
*B60Q 3/80* (2017.01)
*B60K 35/28* (2024.01)
*B60Q 3/74* (2017.01)

(52) U.S. Cl.
CPC ................ *B60Q 3/80* (2017.02); *B60K 35/28* (2024.01); *B60Q 3/74* (2017.02)

(58) Field of Classification Search
CPC . B60Q 3/80; B60Q 3/74; B60Q 1/543; B60Q 1/0088; B60Q 11/005; B60Q 2400/40; B60K 35/28
See application file for complete search history.

(56) References Cited

FOREIGN PATENT DOCUMENTS

| | | | | |
|---|---|---|---|---|
| KR | 20190062685 A | * | 6/2019 | ............. B60R 25/10 |
| KR | 20200104530 A | * | 9/2020 | ........... B60Q 11/005 |
| KR | 20220034584 A | | 3/2022 | |
| KR | 20220034953 A | * | 3/2022 | ........... B60Q 1/0088 |
| WO | WO2019053890 A1 | * | 11/2019 | ............. B60K 35/21 |

OTHER PUBLICATIONS

Machine Translation of KR 20220034953 A PDF File Name: "KR20220034953A_Machine_Translation.pdf" (Year: 2022).*
Machine Translation of KR 20190062685 A PDF File Name: "KR20190062685A_Machine_Translation.pdf" (Year: 2019).*
Machine Translation of KR 20200104530 A PDF File Name: "KR20200104530A_Machine_Translation.pdf" (Year: 2020).*
Machine Translation of JP WO2019053890 A1 PDF File Name: "JPWO2019053890A1_Machine_Translation.pdf" (Year: 2019).*

* cited by examiner

*Primary Examiner* — Grant Moubry
*Assistant Examiner* — Ruben Picon-Feliciano
(74) *Attorney, Agent, or Firm* — Lempia Summerfield Katz LLC

(57) ABSTRACT

A system for controlling a vehicle condition check light by using a dynamic welcome light (DWL) mode includes a lamp unit provided in a vehicle and having a plurality of light sources arranged therein. The system also includes: a lamp control unit configured to turn on the lamp unit; a first component control unit configured to receive a first state information signal of a first component and transmit the first state information signal to the lamp control unit; and a first domain control unit configured to transmit a DWL operating signal to the lamp control unit when a DWL operation condition is satisfied.

15 Claims, 22 Drawing Sheets

OPERATE WELCOME — S11

RECEIVE VEHICLE INFORMATION
(BATTERY RESIDUAL AMOUNT, ETC.) SIGNAL — S12

MATCH VEHICLE SIGNAL AND
DWL SELECTION MODE — S13

OPERATE WELCOME SCENARIO FOR MATCHING
VEHICLE INFORMATION (BATTERY RESIDUAL
AMOUNT, ETC.) (WITHIN 10 SECONDS) — S14

END WELCOME — S15

OPERATE WELCOME — S11

RECEIVE VEHICLE INFORMATION (BATTERY RESIDUAL AMOUNT, ETC.) SIGNAL — S12

S42

OPERATE TURN OPERATION ONCE

S41

VEHICLE INFORMATION MATCHING IS COMPLETED?    N

Y

MATCH VEHICLE SIGNAL AND DWL SELECTION MODE — S13

OPERATE WELCOME SCENARIO FOR MATCHING VEHICLE INFORMATION (BATTERY RESIDUAL AMOUNT, ETC.) (WITHIN 10 SECONDS) — S14

END WELCOME — S15

11

10

20

FIG. 21
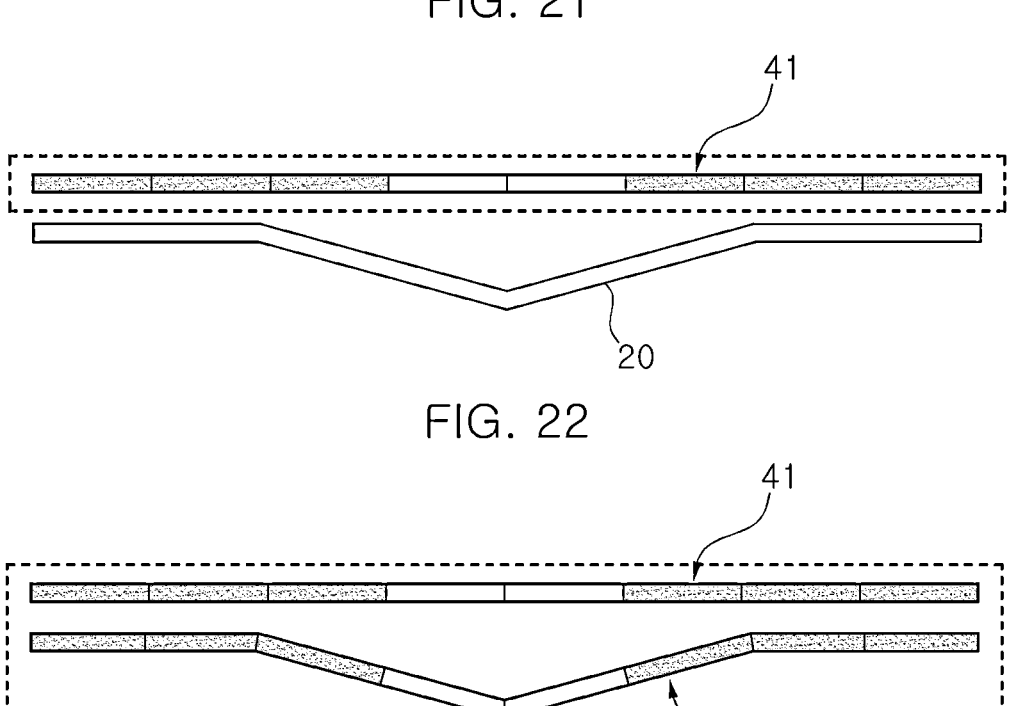
FIG. 22
FIG. 23
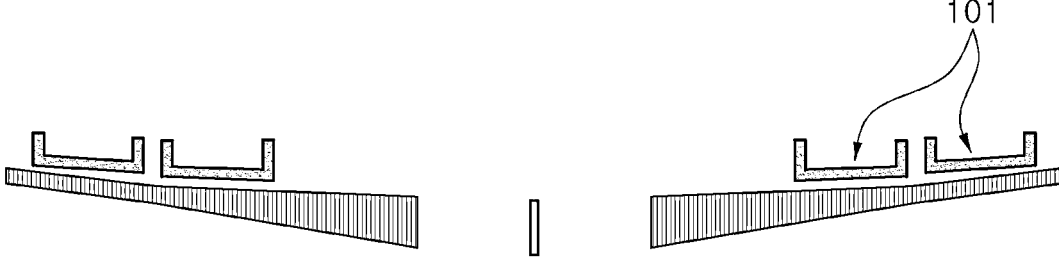

102

102-1

103

103-1

104

104-1

105

SYSTEM AND METHOD FOR CONTROLLING A VEHICLE CONDITION CHECK LIGHT USING A DWL MODE

CROSS-REFERENCE TO RELATED APPLICATION

This application claims priority to Korean Patent Application No. 10-2023-0123273, filed on Sep. 15, 2023, which is incorporated herein by reference in its entirety.

BACKGROUND

Field of the Disclosure

The present disclosure relates to a method and system for controlling a vehicle condition check light by using a dynamic welcome light (DWL) mode.

Description of Related Art

A welcome mode provided in a vehicle is a mode in which a lamp provided in the vehicle is turned on to welcome a user when a locking device is unlocked by a user from the outside of the vehicle.

The welcome mode, which only displays the position of the vehicle, is allowed in countries around the world. However, in addition to the welcome mode, the range of permissions for displaying vehicle conditions, such as a charging state of an electric vehicle, varies depending on the country.

Customer requests for exterior indication of vehicle conditions, such as a charging state, continue to be raised, but there is no regulatory framework governing the display of the charging state in exterior lamp regulations. For this reason, limitations may arise in displaying the charging state in some countries.

In other words, it is difficult to implement a function of immediately identifying whether the current condition is a drivable condition from outside of the vehicle before the vehicle travels, i.e., drives. Further, there is a need for a technology to inspect functions, such as a tire air pressure state in addition to the charging state, which are required to operate the vehicle, while allowing the user to find his/her vehicle.

The above information disclosed as the related art is only to enhance understanding of the background of the present disclosure. Therefore, the Background section may contain information that does not form the related art that is already known to a person of ordinary skill in the art.

SUMMARY

Accordingly, objects of the present disclosure considering the above point are to provide a method and a system for controlling a vehicle condition check light that uses a dynamic welcome light (DWL) mode. The DWL mode is capable of inspecting whether the current condition is a travelable, i.e., drivable, condition from outside of a vehicle before the vehicle travels, i.e., drives, by using a function of a DWL (a courtesy lamp for inspecting a vehicle condition).

As an embodiment, a system for controlling a vehicle condition check light by using a DWL mode includes a lamp unit provided in a vehicle and having a plurality of light sources arranged therein. The system also includes a lamp control unit configured to control an operation of or facilitate turning on the lamp unit and includes a first component control unit configured to receive a first state information signal of a first component and to transmit the first state information signal to the lamp control unit. The system also includes a first domain control unit configured to transmit a DWL operating signal to the lamp control unit when a DWL operation condition is satisfied. The lamp control unit facilitates or controls the operation of turning on vehicle condition display units, which are a portion of the light sources constituting the lamp unit, according to a set DWL mode in which the DWL operating signal and the first state information signal are matched.

In this case, the lamp control unit may perform control to turn on the vehicle condition display units after controlling the operation of turning on the light sources constituting the lamp unit.

Further, the lamp control unit may be configured to receive selection mode information of the DWL mode for controlling the operation of turning on the vehicle condition display units from a power application unit. The lamp control unit may also be configured to control the operation of turning on the vehicle condition display units.

In addition, the DWL operation condition may include a vehicle-turned-off condition and a vehicle-door-locked (unlocked) condition.

Further, the set DWL mode may be a mode in which a turn-on state of the vehicle condition display units is set in advance in a stepwise manner to correspond to a state of the first component by the first state information signal.

Furthermore, the lamp control unit may be configured to perform control to turn on all or a portion of the plurality of light sources of the vehicle condition display units in the set DWL mode.

The system may further include a signal input unit configured to input a DWL selection mode for selecting the DWL mode for controlling the operation of turning on the vehicle condition display units. The system may also include a high-level control unit configured to receive the DWL selection mode and transfer selection mode information of the DWL mode to the lamp control unit.

Alternatively, the system may further include an external server configured to receive DWL information including the DWL mode for controlling the operation of turning on the vehicle condition display units and transfer the DWL information. The system may also include a high-level control unit configured to receive the DWL information from the external server and transfer selection mode information of the DWL mode to the lamp control unit.

Further, the system may include a second component control unit configured to receive a second state information signal of a second component. The system may include a high-level control unit configured to receive the second state information signal from the second component control unit and transmit the second state information signal to the lamp control unit. The lamp control unit may be configured to control the operation of turning on the vehicle condition display units, which are some of the light sources constituting the lamp unit, according to the set DWL mode in which the DWL operating signal, the first state information signal, and the second state information signal are matched.

As another embodiment, a system for controlling a vehicle condition check light by using a DWL mode includes a lamp unit provided in a vehicle and having a plurality of light sources arranged therein and a lamp control unit configured to control an operation of turning on the lamp unit. The system may include a second component control unit configured to receive a second state information signal of a second component and transmit the second state information signal to the lamp control unit. The system may also include a high-level control unit configured to receive the second state information signal and transmit the second state information signal to the lamp control unit. Additionally, the system may include a first domain control unit configured to transmit a DWL operating signal to the lamp control unit when a DWL operation condition is satisfied. The lamp control unit receives selection mode information, which is a turn-on control mode of the lamp unit, from the high-level control unit and controls an operation of turning on vehicle condition display units, which are some of the light sources constituting the lamp unit, according to a set DWL mode in which the DWL operating signal and the second state information signal are matched.

In this case, the DWL operation condition may include a vehicle-turned-off condition and a vehicle-door-locked (unlocked) condition.

Further, the set DWL mode may be a mode in which a turn-on state of the vehicle condition display units is set in advance in a stepwise manner to correspond to a state of the first component by the first state information signal.

The system may further include: a signal input unit configured to input a DWL selection mode for selecting the DWL mode for controlling the operation of turning on the vehicle condition display units, in which the high-level control unit receives the DWL selection mode and transmits the DWL selection mode to the lamp control unit.

Alternatively, the system may further include an external server configured to receive DWL information including the DWL mode for controlling the operation of turning on the vehicle condition display unit and transfer the DWL information. The high-level control unit receives the DWL information from the external server and transfers selection mode information of the DWL mode to the lamp control unit.

Furthermore, the system may further include an external lamp mounted in the vehicle independently of the lamp unit. The high-level control unit may be configured to control an operation of turning on the external lamp to correspond to a state of the second component by the second state information signal.

As still another embodiment, a method of controlling a vehicle condition check light by using a DWL mode includes controlling and operating a lamp unit, which includes a lamp control unit provided in a vehicle and having a plurality of light sources arranged therein, in a welcome mode when a DWL operating signal is received. The method also includes receiving, by the lamp control unit, a state information signal of a vehicle component and matching, by the lamp control unit, the DWL operating signal and the state information signal. The method also includes controlling, by the lamp control unit, an operation of turning on vehicle condition display units, which are a portion of the light sources constituting the lamp unit, according to a set DWL mode in which the DWL operating signal and the first state information signal are matched.

In this case, the DWL operating signal is generated when a DWL operation condition including a vehicle-turned-off condition and a vehicle-door-locked (unlocked) condition is satisfied.

Further, the set DWL mode may be a mode in which a turn-on state of the vehicle condition display units is set in advance in a stepwise manner to correspond to a state of the vehicle component by the state information signal.

In addition, the method may include identifying, by the lamp control unit, whether the state information signal is received after receiving the state information signal. Matching the DWL operating signal and the state information signal may be performed when identifying whether the state information signal is received identifies that the state information signal is received.

Alternatively, the method may further include identifying, by the lamp control unit, whether matching the DWL operating signal and the state information signal is completed after matching the DWL operating signal and the state information signal. Controlling the operation of turning on the vehicle condition display units may be performed when identifying whether matching the DWL operating signal and the state information signal is completed.

According to the method and system for controlling the vehicle condition check light by using the DWL mode of the present disclosure, it is possible to display the vehicle condition, such as the charging state of the vehicle, to the outside by using the DWL mode. As a result, it is possible to immediately identify whether the current condition is the travelable condition from outside of the vehicle before the vehicle travels.

Further, it is possible to inspect functions, such as a tire air pressure state in addition to the charging state, which are required to drive the vehicle, while allowing the user to find his/her vehicle.

BRIEF DESCRIPTION OF THE DRAWINGS

FIGS. 14-16 are views illustrating application embodiments of a vehicle condition check light control method using a DWL mode of the present disclosure.

FIGS. 17-22 are views schematically illustrating embodiments of a vehicle condition check light according to the present disclosure.

FIGS. 23-31 are views illustrating operating states of various embodiments of a vehicle condition check light according to the present disclosure.

DETAILED DESCRIPTION

Hereinafter, embodiments of the present disclosure are described in detail with reference to the accompanying drawings. Since these embodiments, as examples, may be implemented in various different forms by those having ordinary skill in the art to which the present disclosure pertains, the scope of the disclosure is not limited to the embodiments described herein.

In order to better understand the present disclosure, advantages in operation of the concepts of the present disclosure, and the objects to be achieved by carrying out the present disclosure, reference should be made to the accompanying drawings illustrating embodiments of the present disclosure and to the contents disclosed in the accompanying drawings.

Further, in the description of the present disclosure, the repetitive descriptions of publicly-known related technologies have been reduced or omitted where it has been determined that the descriptions may unnecessarily obscure the subject matter of the present disclosure.

When a controller, component, device, element, part, unit, module, or the like of the present disclosure is described as having a purpose or performing an operation, function, or the like, the component, device, or element should be considered herein as being "configured to" meet that purpose or perform that operation or function. Each controller, component, device, element, part, unit, module, and the like may separately embody or be included with a processor and a memory, such as a non-transitory computer readable media, as part of the apparatus.

Figure 1:
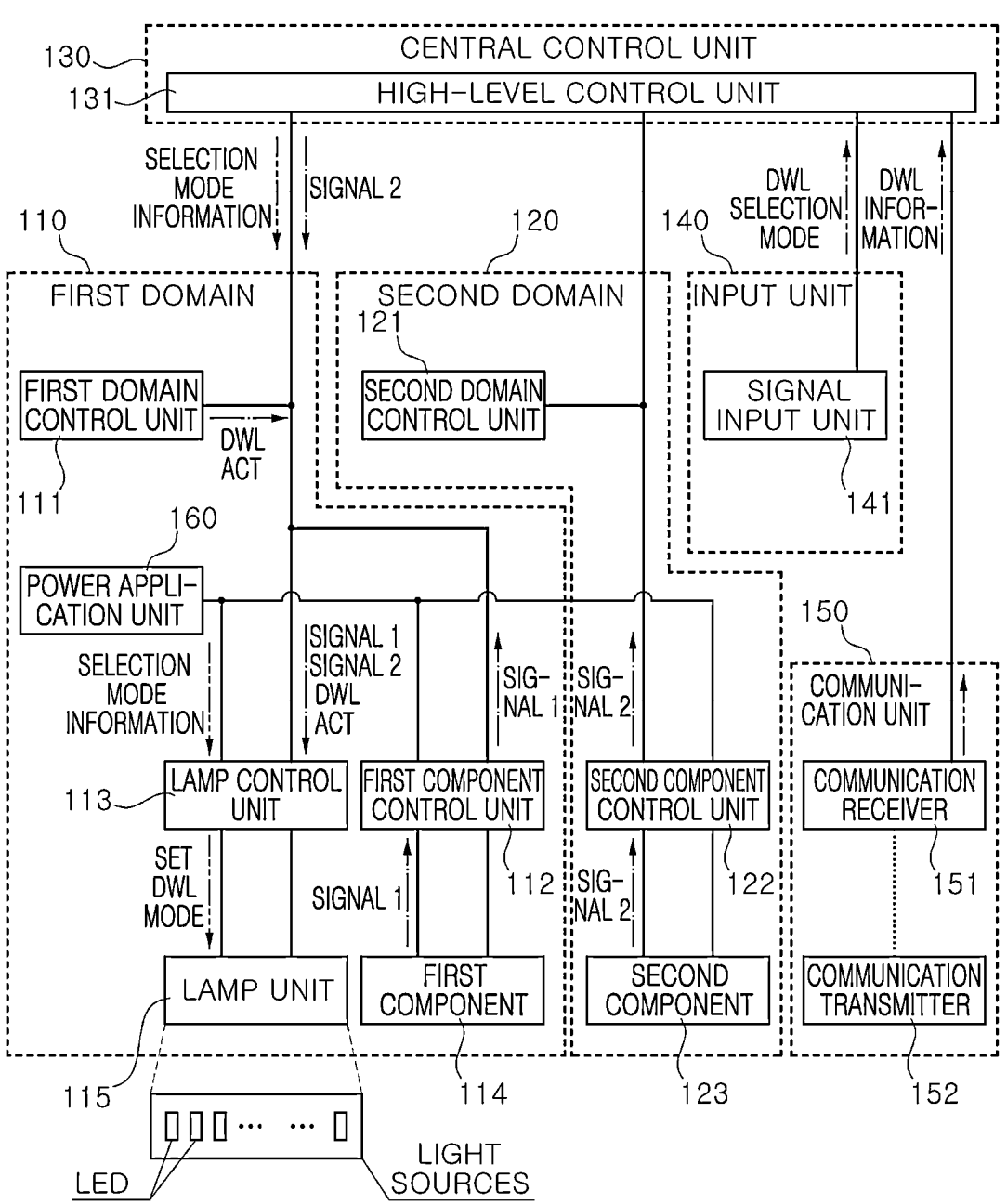
FIG. 1 is a view schematically illustrating an embodiment of a vehicle condition check light control system using a dynamic welcome light (DWL) mode of the present disclosure.

FIG. 1 is a view schematically illustrating a vehicle condition check light control system using a dynamic welcome light (DWL) mode of the present disclosure. Hereinafter, the vehicle condition check light control system using the DWL mode according to the embodiment of the present disclosure is described with reference to FIG. 1.

The present disclosure relates to a system and method capable of turning on a vehicle condition check light by use of a DWL mode in order for a user to recognize a vehicle condition including a charging state of a vehicle when the user unlocks a locking device of the vehicle from the outside.

With reference to FIG. 1, the present disclosure may include a first domain 110, a second domain 120, a central control unit 130, an input unit 140, and a communication unit 150. The present disclosure may implement functions by including all the components or using a combination of some of the components.

The first domain 110 includes a first domain control unit 111, a first component control unit 112, a lamp control unit 113, a first component 114, and a lamp unit 115.

The central control unit 130 includes a high-level control unit 131 that is a control means operating at a higher level than the first domain control unit 111. The high-level control unit 131 may be a central communication unit (CCU) configured to process a controller area network (CAN) signal.

The first domain control unit 111 serves to transfer selection mode information, which is a control signal, and a DWL operating signal (DWL/ACT) of the high-level control unit 131 to the lamp control unit 113.

The first component control unit 112 receives a signal 1, which is a signal including state information of the first component 114, and transmits signal 1 to the first domain control unit 111 or the lamp control unit 113. The lamp control unit 113 receives the selection mode information and a signal 2 from the high-level control unit 131 and receives the DWL operating signal from the first domain control unit 111.

The lamp control unit 113 aggregates the received selection mode information and the received DWL operating signal and controls an operation of turning on the lamp unit 115 in response to the set DWL mode signal. The lamp control unit 113 may be a lamp central control unit (LCU) that is an ILCU/IRCU logic integrated controller.

The lamp unit 115 may be provided at a front or rear side of the vehicle as a headlamp, a rear combination lamp, or the like. The lamp unit 115 may be implemented by a plurality of LED light sources (not illustrated in FIG. 1) arranged in a predetermined pattern for implementing an aesthetic appearance.

Therefore, among the plurality of LED light sources of the lamp unit 115, a predetermined number of light sources or the light sources disposed at predetermined positions are turned on in response to the set DWL mode signal. The plurality of LED light sources may be dynamically implemented by differently setting turn-on timings of the arranged light sources.

According to the present disclosure, when the set DWL mode is implemented under the control of the lamp control unit 113, the lamp control unit 113 controls one or more vehicle condition display units, which include one or more of the light sources constituting the lamp unit 115. In this manner, the set DWL mode, which is modified to correspond to signal 1 and signal 2, is implemented on a pattern of a general welcome mode of the lamp unit 115.

In other words, the operation of turning on or off some of the light sources is changed and displayed by a light source control method determined depending on the general welcome mode.

The system further includes a power application unit 160 configured to supply power to the lamp control unit 113, the first component control unit 112, a second component control unit 122, the first component 114, a second component 123, and the lamp unit 115. The power application unit 160 may be a 12 V battery power source.

Next, the second domain 120 includes a second domain control unit 121, the second component control unit 122, and the second component 123.

The second component control unit 122 receives signal 2, which is a signal including state information of the second component 123, and transmits signal 2 to the second domain control unit 121. The second domain control unit 121 transmits signal 2 to the high-level control unit 131.

Then, the high-level control unit 131 controls the lamp unit 115 by transferring the selection mode information and signal 2 to the lamp control unit 113 of the first domain 110.

The first component 114 and the second component 123 may be components excluding the lamp unit 115 and configured to perform functions required to drive the vehicle. The first component 114 may be a tire or the like, and the second component 123 may be a traveling battery.

As described above, the first domain control unit 111 may be an integrated body control unit (IBU), a body domain controller (BDC), or the like that is a control device configured to control a component including the lamp function. The second domain control unit 121 is a control device configured to control the second component 123, except for the lamp function.

The input unit 140 includes a signal input unit 141. The DWL selection mode of the user is inputted to the high-level control unit 131 through the signal input unit 141, and the high-level control unit 131 transfers the selection mode information. The signal input unit 141 is a head unit (H/U) and may be audio, video, and navigation (AVN).

The communication unit 150 includes a communication receiver 151 and a communication transmitter 152.

The communication unit 150 serves to allow an external means, such as a connected car service (CCS) server, to select the DWL mode. When the selection information inputted through the external means is inputted to the communication receiver 151 through the communication transmitter 152, the selected DWL information is transferred to the high-level control unit 131 through the communication receiver 151.

In this case, the DWL information may be user information (certificate, VIN NO, ECU ID, and the like), function activation keys (FOD), activation success check, function information (OTA), turn-on LED information according to the DWL mode (turn-on/off design for each mode selected by the user), and DWL selection mode information (operating mode selected by the user).

An operation of the vehicle condition check light control system using the DWL mode of the present disclosure, which has been described above, is described below.

First, the high-level control unit 131 receives state information of the second component 123, e.g., vehicle information (signal 2) of a tire or the like from the second domain control unit 121.

Further, the first component 114, which is bound together with the lamp unit 115 in the same domain, may not pass through the high-level control unit 131, like signal 1.

The high-level control unit 131 transfers vehicle information of signal 2 to the lamp control unit 113. The first domain control unit 111 transfers the DWL operation information (DWL/ACT) to the lamp control unit 113. The first component control unit 112, which is bound in the same domain, may directly receive a signal (signal 1) from the first component 114.

Next, the lamp control unit 113, the first domain control unit 111, or the high-level control unit 131 aggregates the selection mode information and the signal (battery residual amount or tire air pressure) and transmits the set DWL mode, which operates when the DWL operating signal of the first domain is received, to the lamp unit 115.

The high-level control unit 131 may change the selection mode information and transfer the selection mode information to the lamp control unit 113 based on the information received from the signal input unit 141 and the communication receiver 151.

In this case, the set DWL mode may be a mode in which an implementation degree (the number of turned-on light sources and the like) is pre-set in a stepwise manner depending on the vehicle condition such as a battery residual charge amount.

Further, the control system of the present disclosure may implement the function only by using a combination of some of the first domain 110, the second domain 120, the central control unit 130, the input unit 140, and the communication unit 150.

FIGS. 2-12 are views illustrating application embodiments of the vehicle condition check light control system using the DWL mode of the present disclosure.

Figure 2:
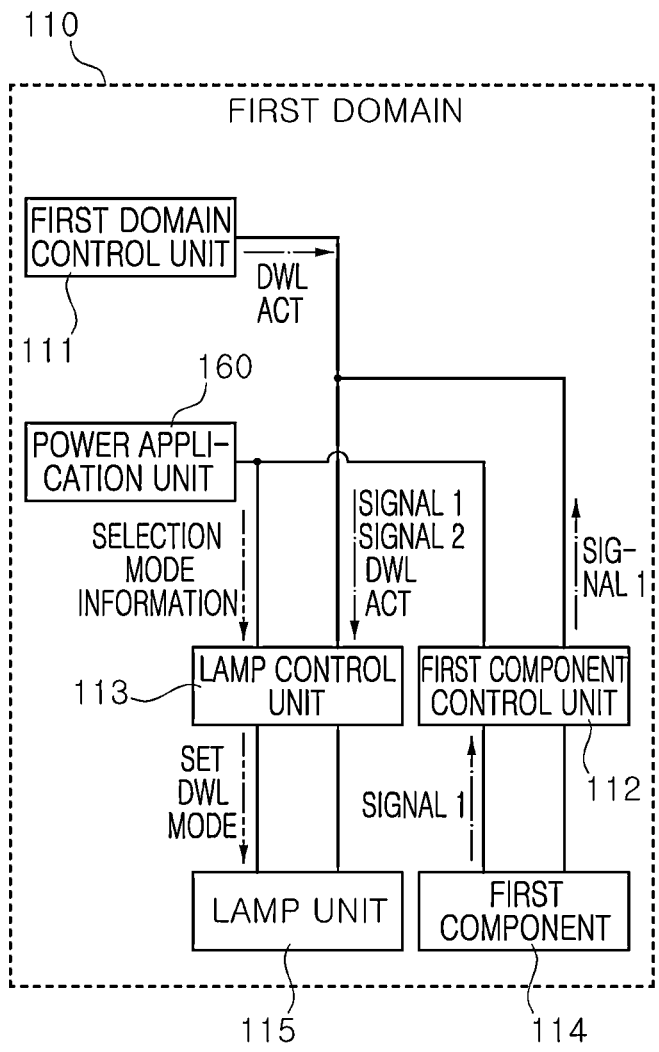
FIGS. 2-12 are views illustrating application embodiments of a vehicle condition check light control system using a DWL mode of the present disclosure.

First, as illustrated in FIG. 2, the system may be configured only by the first domain 110 as a minimum component.

In other words, when a local signal system in the first domain 110 receives a status signal (signal 1) of a low-level controller (the first component control unit 112), which is bound together with the lamp unit 115 in the same domain, and when the first domain control unit 111 transmits the DWL/ACT signal, the first domain control unit 111 may transmit the DWL/ACT signal, which is changed by a combination of signal 1. Alternatively, the lamp control unit 113 may transmit the set DWL mode to the lamp unit 115 by a combination of the DWL/ACT signal and signal 1. Because signal 1 is inputted to the local signal system, the low-level controller needs to be bound together with the lamp unit 115 in the single domain (i.e., the first domain).

Figure 3:
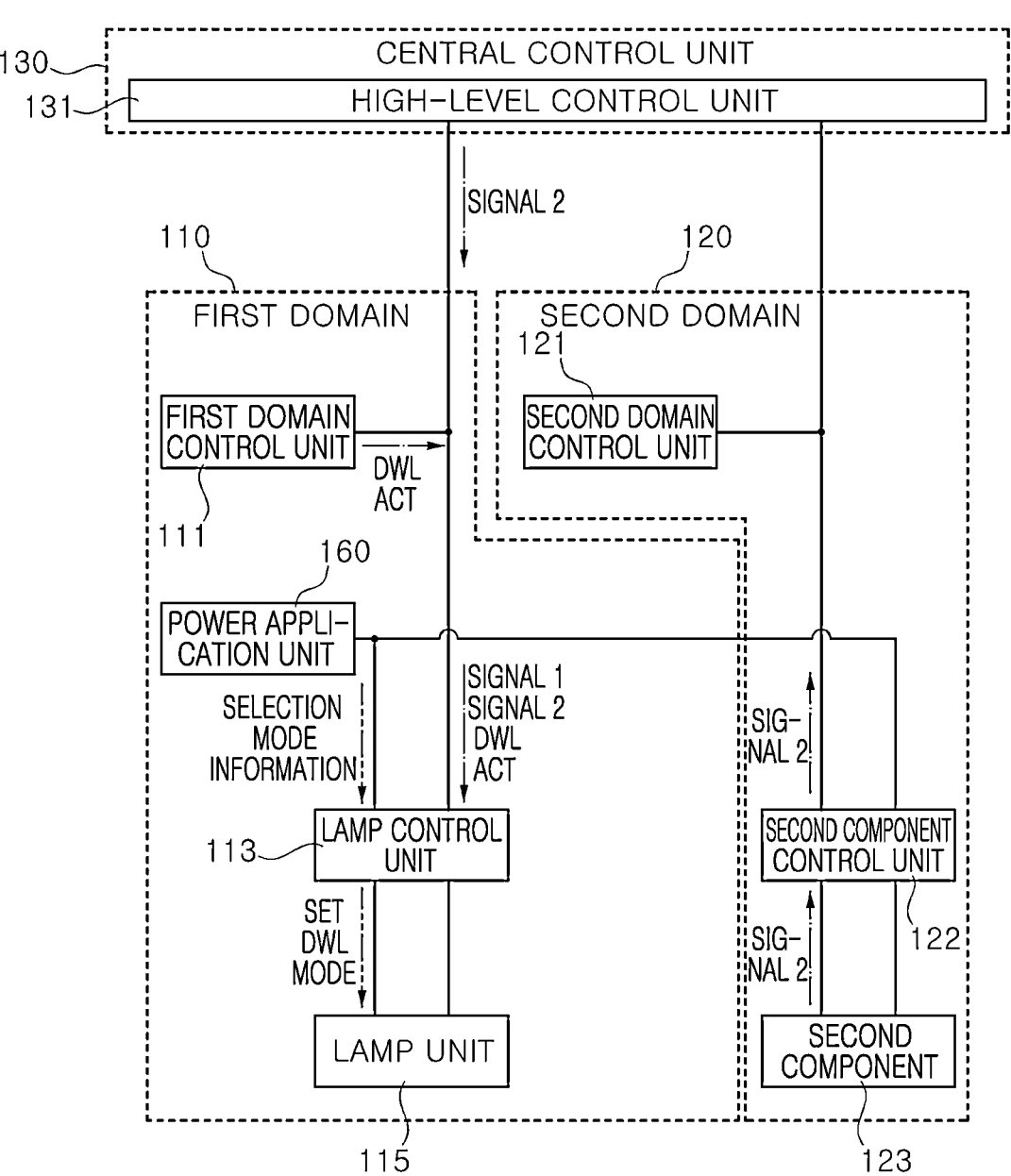

Further, as illustrated in FIG. 3, the system may include the first domain 110, the second domain 120, and the central control unit 130. The system may exclude the first component 114 and the first component control unit 112.

In this case, the high-level control unit 131 is required to allow the local signal system in the first domain 110 to receive the status signal (signal 2) of the low-level controller (second component controller 122) that is not bound together with the lamp unit 115 in the same domain.

When the first domain control unit 111 transmits the DWL/ACT signal, the first domain control unit 111 may transmit the DWL/ACT signal, which is changed by a combination of signal 2. Alternatively, the lamp control unit 113 may transmit the set DWL mode to the lamp unit 115 through a combination of the DWL/ACT signal and signal 2. Because the second component 123 and the lamp unit 115 are separated in different domains, a necessary signal needs to be managed by the central control unit 130.

Figure 4:
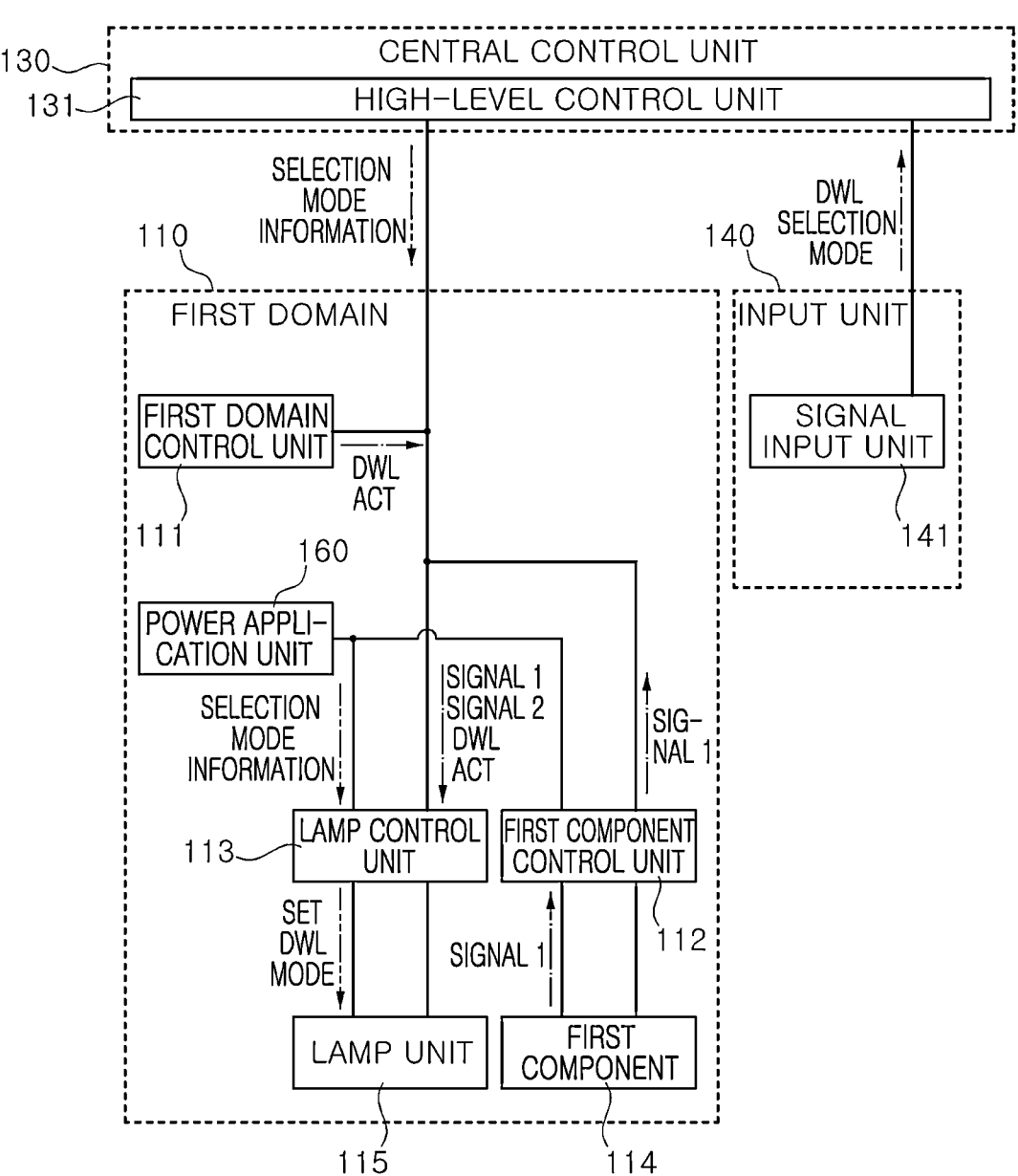

Next, with reference to FIG. 4, the system may include the first domain 110, the input unit 140, and the central control unit 130.

In other words, when the local signal system in the first domain 110 receives the status signal (signal 1) of the low-level controller (the first component control unit 112), which is bound together with the lamp unit 115 in the same domain, and when the first domain control unit 111 transmits the DWL/ACT signal, the first domain control unit 111 may transmit the DWL/ACT signal, which is changed by a combination of signal 1. Alternatively, the lamp control unit 113 may transmit the set DWL mode to the lamp unit 115 by a combination of the DWL/ACT signal and signal 1. Because signal 1 is inputted to the local signal system, the low-level controller needs to be bound together with the lamp unit 115 in the single domain (i.e., the first domain).

Further, the user may convert the DWL mode by the signal input unit 141. The set DWL mode is designated by a combination of the converted DWL mode and signal 1.

Figure 5:
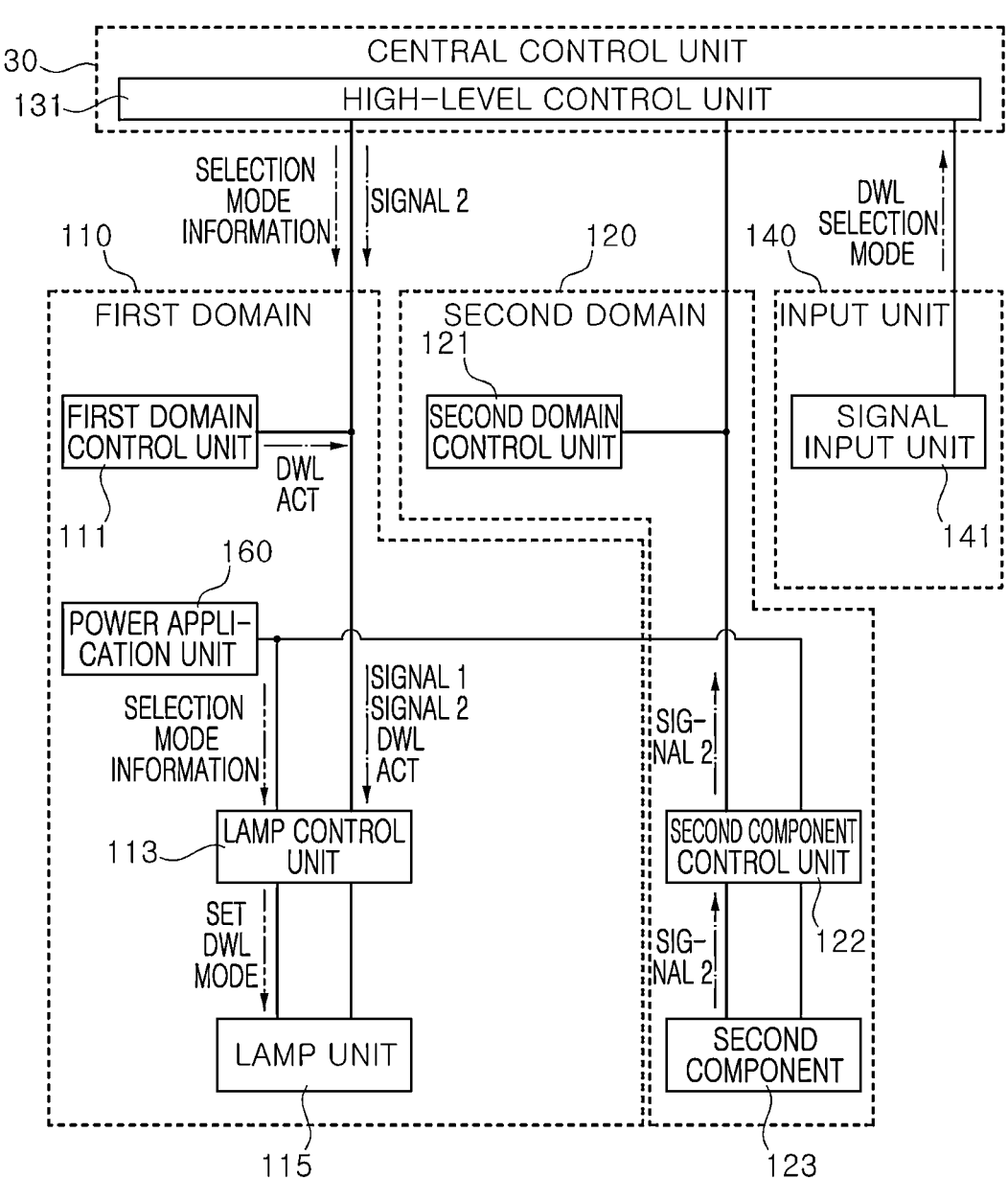

Alternatively, with reference to FIG. 5, the system may include the first domain 110, the second domain 120, the central control unit 130, and the input unit 140. The system may exclude the first component 114 and the first component control unit 112.

In this case, the high-level control unit 131 is required to allow the local signal system in the first domain 110 to receive the status signal (signal 2) of the low-level controller (second component controller 122) that is not bound together with the lamp unit 115 in the same domain.

When the first domain control unit 111 transmits the DWL/ACT signal, the first domain control unit 111 may transmit the DWL/ACT signal, which is changed by a combination of signal 2. Alternatively, the lamp control unit 113 may transmit the set DWL mode to the lamp unit 115 through a combination of the DWL/ACT signal and signal 2. Because the second component 123 and the lamp unit 115 are separated in different domains, a necessary signal needs to be managed by the central control unit 130.

Further, the user may convert the DWL mode by the signal input unit 141. The set DWL mode is designated by a combination of the converted DWL mode and signal 2.

Figure 6:
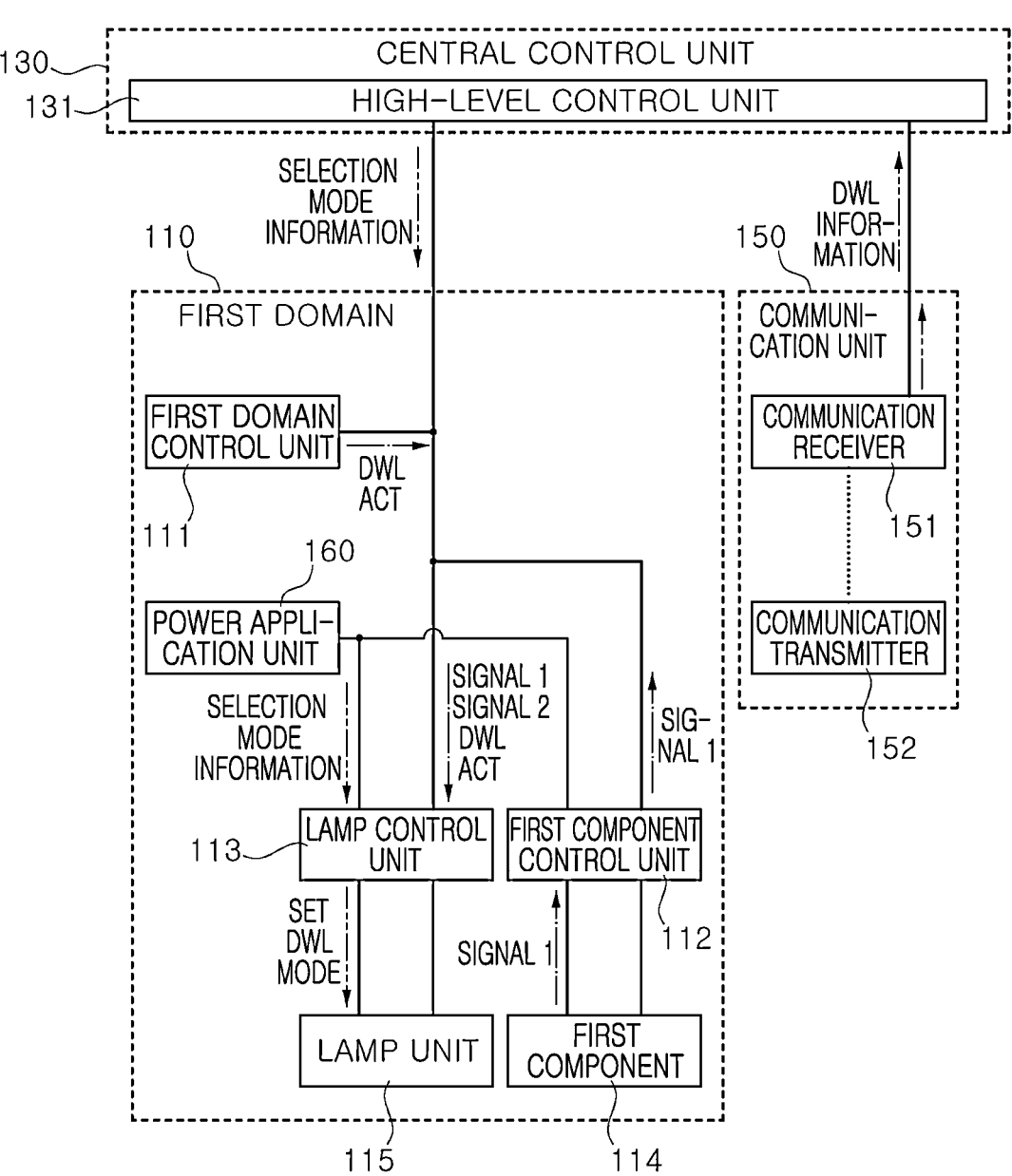

Next, as illustrated in FIG. 6, the system may include the first domain 110, the central control unit 130, and the communication unit 150.

In other words, when the local signal system in the first domain 110 receives the status signal (signal 1) of the low-level controller (the first component control unit 112), which is bound together with the lamp unit 115 in the same domain, and when the first domain control unit 111 transmits the DWL/ACT signal, the first domain control unit 111 may transmit the DWL/ACT signal, which is changed by a combination of signal 1. Alternatively, the lamp control unit 113 may transmit the set DWL mode to the lamp unit 115 by a combination of the DWL/ACT signal and signal 1. Because signal 1 is inputted to the local signal system, the low-level controller needs to be bound together with the lamp unit 115 the single domain (i.e., first domain).

Further, the user may convert the DWL mode by the communication unit 150 and update the DWL mode.

The set DWL mode is designated by the combination of the converted mode information and signal 1.

Figure 7:
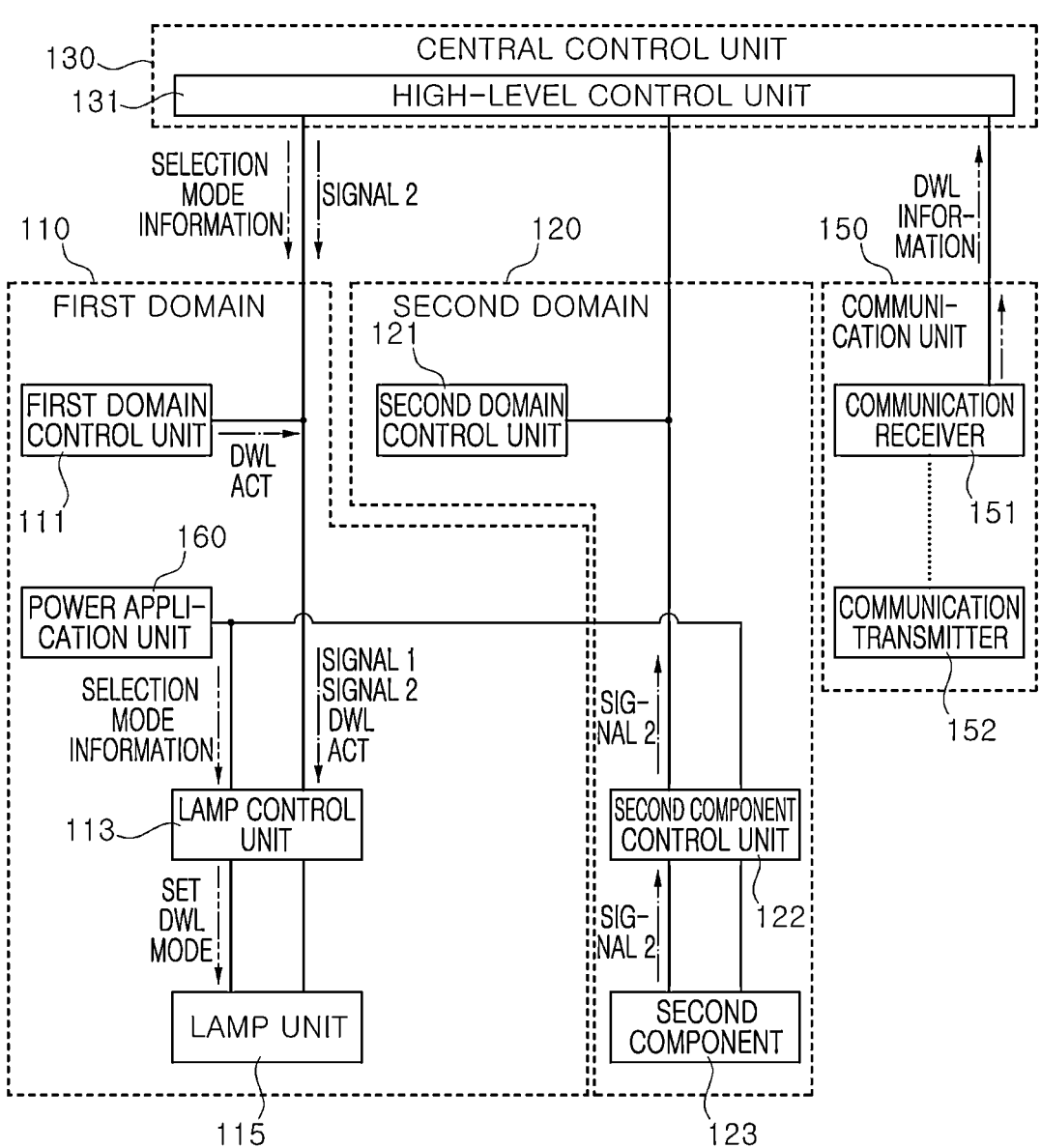

Further, as illustrated in FIG. 7, the system may include the first domain 110, the second domain 120, the central control unit 130, and the communication unit 150. The system may exclude the first component 114 and the first component control unit 112.

In this case, the high-level control unit 131 is required to allow the local signal system in the first domain 110 to receive the status signal (signal 2) of the low-level controller (second component controller 122) that is not bound together with the lamp unit 115 in the same domain.

When the first domain control unit 111 transmits the DWL/ACT signal, the first domain control unit 111 may transmit the DWL/ACT signal, which is changed by a combination of signal 2. Alternatively, the lamp control unit 113 may transmit the set DWL mode to the lamp unit 115 by a combination of the DWL/ACT signal and signal 2. Because the second component 123 and the lamp unit 115 are separated in different domains, a necessary signal needs to be managed by the central control unit 130.

Further, the user may convert the DWL mode by the communication unit 150 and update the DWL mode.

The set DWL mode is designated by the combination of the converted mode information and signal 2.

Figure 8:
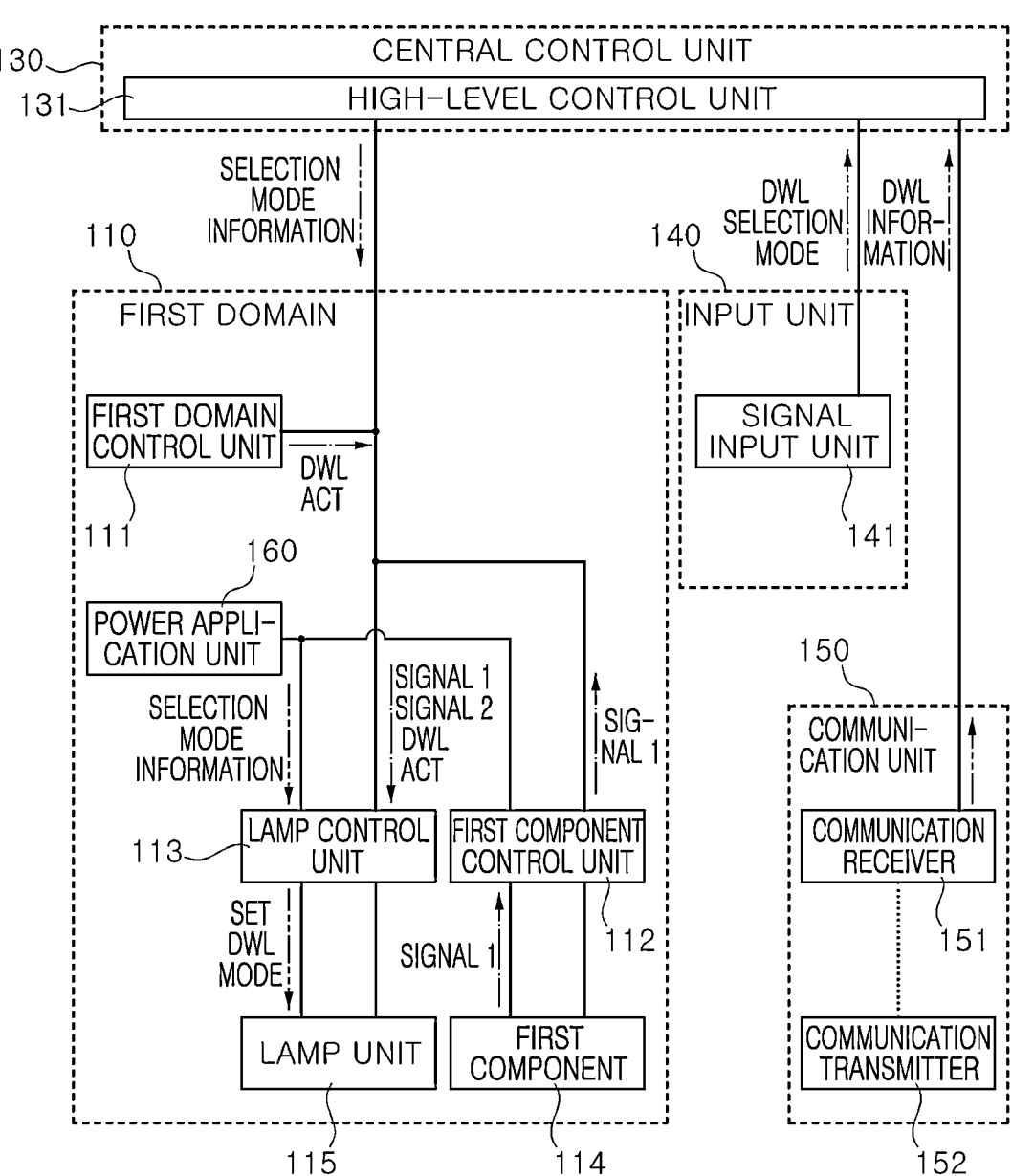

Further, as illustrated in FIG. 8, the system may include the first domain 110, the central control unit 130, the input unit 140, and the communication unit 150.

In other words, when the local signal system in the first domain 110 receives the status signal (signal 1) of the low-level controller (the first component control unit 112), which is bound together with the lamp unit 115 in the same domain, and when the first domain control unit 111 transmits the DWL/ACT signal, the first domain control unit 111 may transmit the DWL/ACT signal, which is changed by a combination of signal 1. Alternatively, the lamp control unit 113 may transmit the set DWL mode to the lamp unit 115 by a combination of the DWL/ACT signal and signal 1. Because signal 1 is inputted to the local signal system, the low-level controller needs to be bound together with the lamp unit 115 with the single domain.

Further, the user may convert the DWL mode by the signal input unit 141. The set DWL mode is designated by a combination of the converted DWL mode and signal 1.

Further, the user may convert the DWL mode by the communication unit 150 and newly update the DWL mode.

The set DWL mode is designated by the combination of the converted mode information and signal 1.

Figure 9:
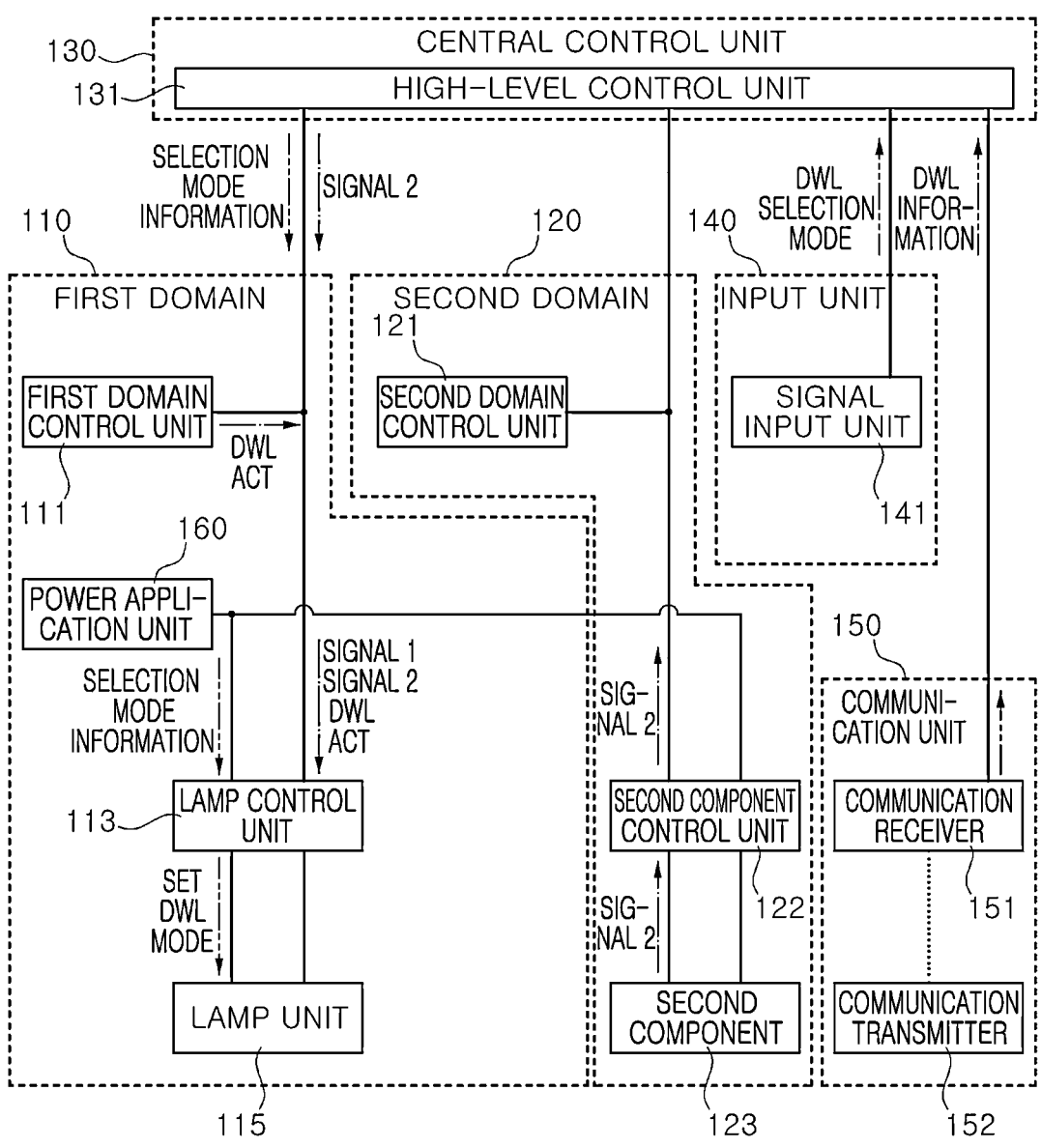

Next, as illustrated in FIG. 9, the system may include the first domain 110, the second domain 120, the central control unit 130, the input unit 140, and the communication unit 150. The system may exclude the first component 114 and the first component control unit 112.

In this case, the high-level control unit 131 is required to allow the local signal system in the first domain 110 to receive the status signal (signal 2) of the low-level controller (second component controller 122) that is not bound together with the lamp unit 115 in the same domain.

When the first domain control unit 111 transmits the DWL/ACT signal, the first domain control unit 111 may transmit the DWL/ACT signal, which is changed by a combination of signal 2. Alternatively, the lamp control unit 113 may transmit the set DWL mode to the lamp unit 115 through a combination of the DWL/ACT signal and signal 2. Because the second component 123 and the lamp unit 115 are separated in different domains, a necessary signal needs to be managed by the central control unit 130.

Further, the user may convert the DWL mode by the signal input unit 141. The set DWL mode is designated by a combination of the converted DWL mode and signal 2.

Further, the user may convert the DWL mode by the communication unit 150 and update the DWL mode.

The set DWL mode is designated by the combination of the converted mode information and signal 2.

Figure 10:
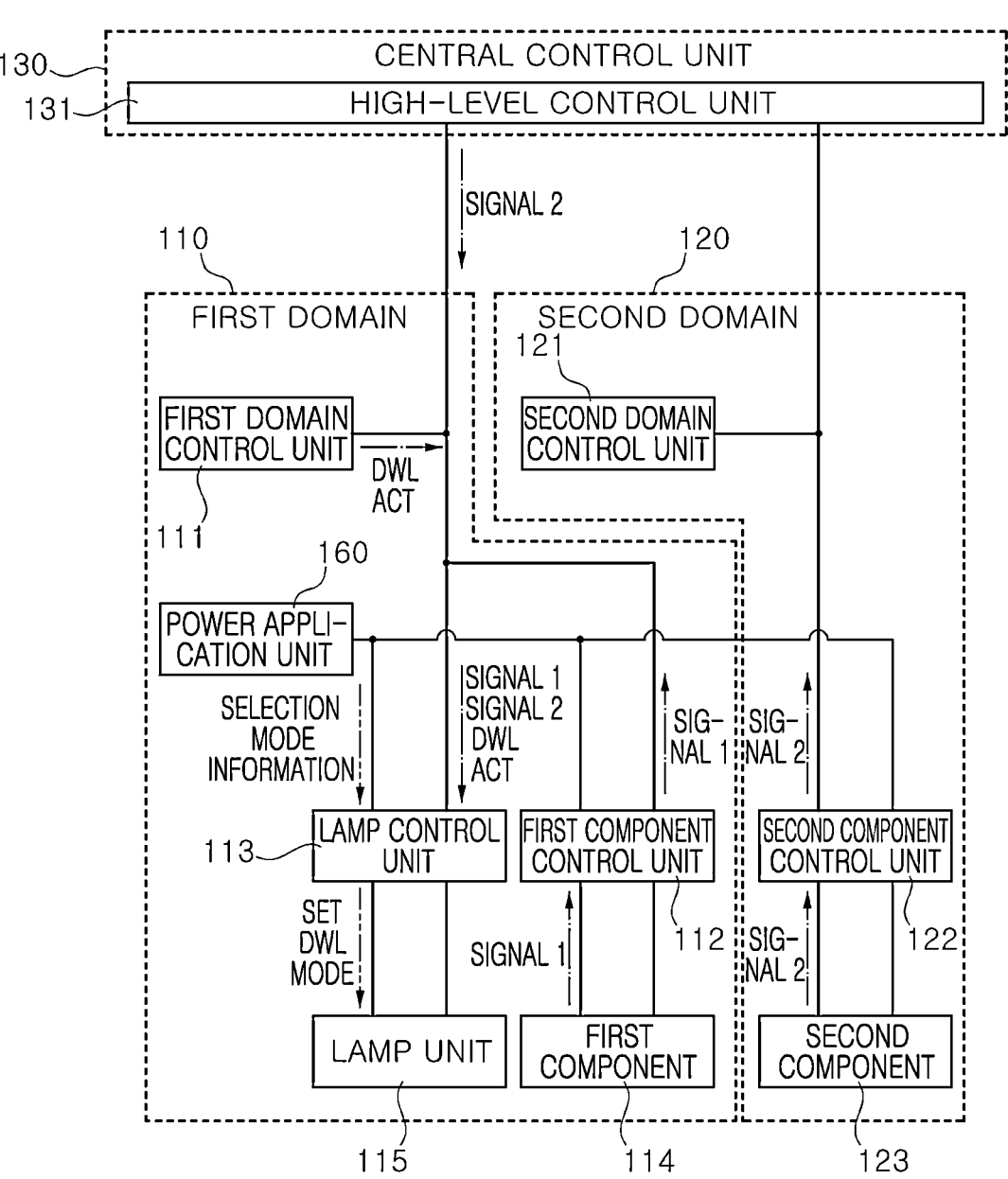

With reference to FIG. 10, the system may include the first domain 110, the second domain 120, and the central control unit 130.

In this case, because the local signal system in the first domain 110 receives the status signal (signal 1) of the low-level controller (the first component controller 112) bound together with the lamp unit 115 in the same domain and inputs signal 1 to the local signal system, the low-level controller needs to be bound together with the lamp unit 115 in the single domain (i.e., the first domain).

Further, the high-level control unit 131 is required to allow the local signal system in the first domain 110 to receive the status signal (signal 2) of the low-level controller (second component controller 122) that is not bound together with the lamp unit 115 in the same domain. The second component 123 and the lamp unit 115 are separated in different domains. Therefore, a necessary signal needs to be managed by the central control unit 130.

When the first domain control unit 111 transmits the DWL/ACT signal, the first domain control unit 111 may transmit the DWL/ACT signal, which is changed by a combination of signal 2. Alternatively, the lamp control unit 113 may transmit the set DWL mode to the lamp unit 115 through a combination of the DWL/ACT signal and signal 2.

Figure 11:
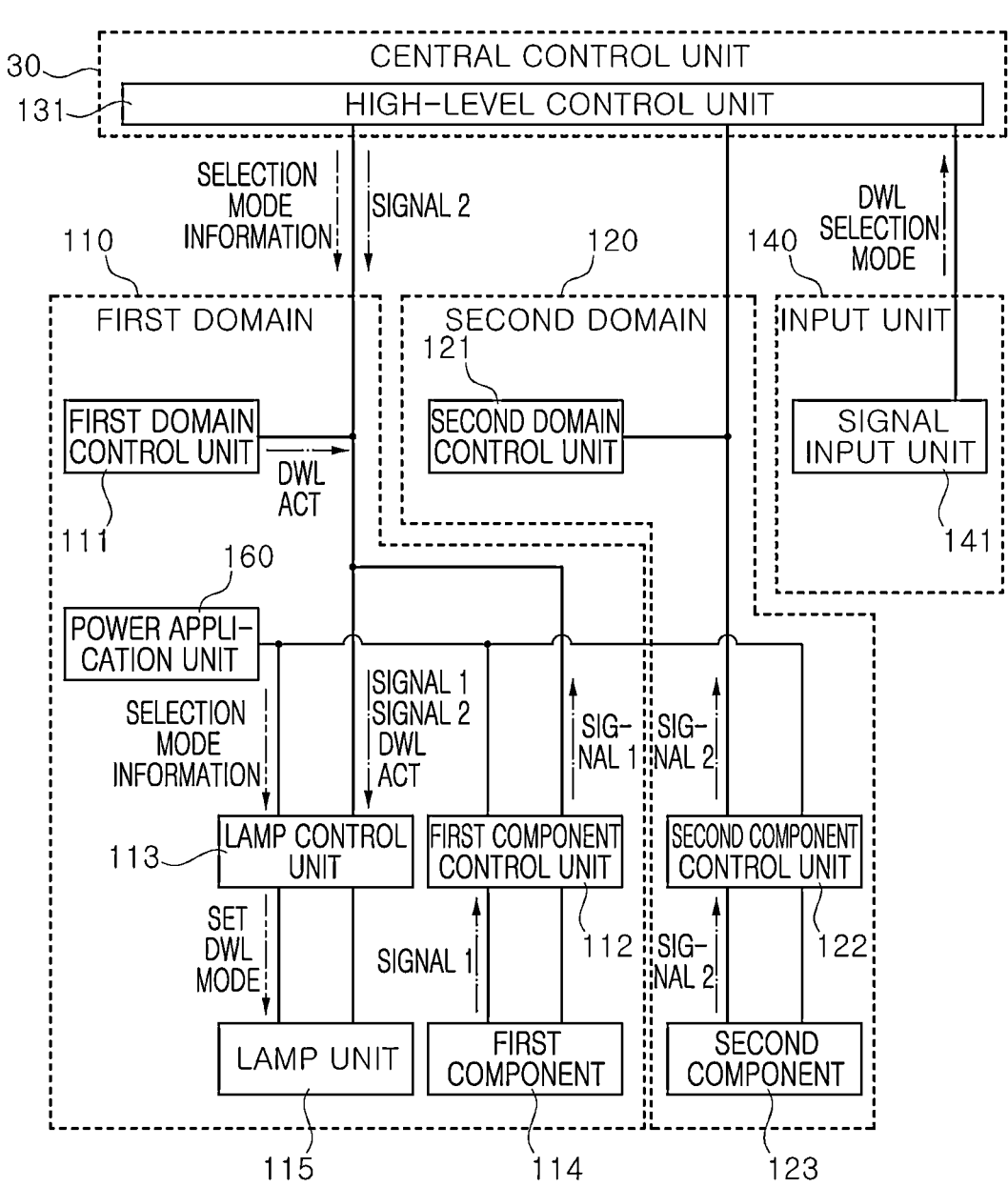

Alternatively, with reference to FIG. 11, the system may include the first domain 110, the second domain 120, the central control unit 130, and the input unit 140.

In this case, because the local signal system in the first domain 110 receives the status signal (signal 1) of the low-level controller (the first component controller 112) bound together with the lamp unit 115 in the same domain and inputs signal 1 to the local signal system, the low-level controller needs to be bound together with the lamp unit 115 in the single domain (i.e., the first domain).

Further, the high-level control unit 131 is required to allow the local signal system in the first domain 110 to receive the status signal (signal 2) of the low-level controller (second component controller 122) that is not bound together with the lamp unit 115 in the same domain. The second component 123 and the lamp unit 115 are separated in different domains. Therefore, a necessary signal needs to be managed by the central control unit 130.

When the first domain control unit 111 transmits the DWL/ACT signal, the first domain control unit 111 may transmit the DWL/ACT signal, which is changed by a combination of signal 1. Alternatively, the lamp control unit 113 may transmit the set DWL mode to the lamp unit 115 through a combination of the DWL/ACT signal and signal 1.

Further, the user may convert the DWL mode by the signal input unit 141, and the set DWL mode is designated by a combination of the converted DWL mode and signal 2.

Figure 12:
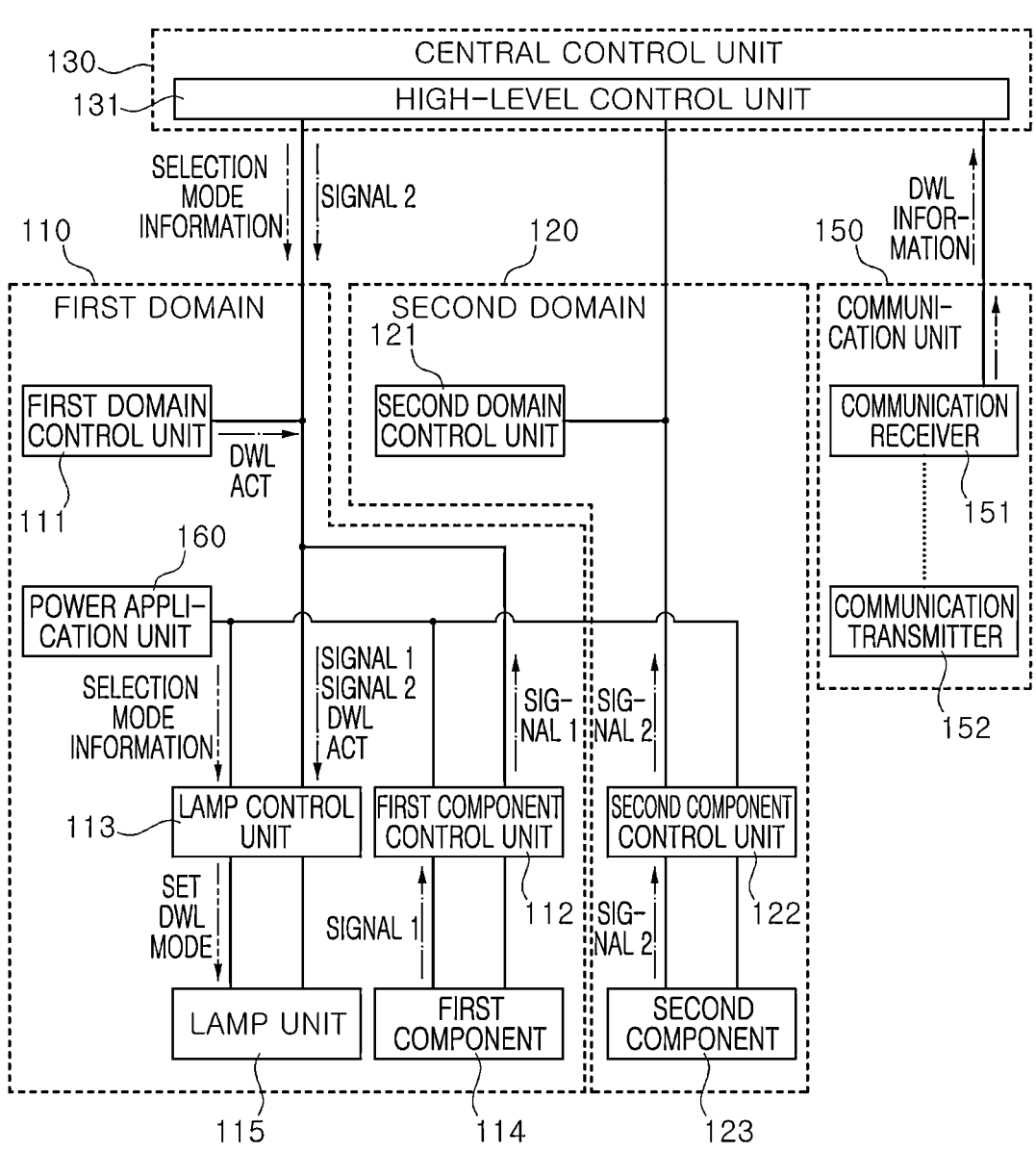

In addition, as illustrated in FIG. 12, the system may include the first domain 110, the second domain 120, the central control unit 130, and the communication unit 150.

In this case, because the local signal system in the first domain 110 receives the status signal (signal 1) of the low-level controller (the first component controller 112) bound together with the lamp unit 115 in the same domain and inputs signal 1 to the local signal system, the low-level controller needs to be bound together with the lamp unit 115 in the single domain (i.e., the first domain).

Further, the high-level control unit 131 is required to allow the local signal system in the first domain 110 to receive the status signal (signal 2) of the low-level controller (second component controller 122) that is not bound together with the lamp unit 115 in the same domain. The second component 123 and the lamp unit 115 are separated in different domains. Therefore, a necessary signal needs to be managed by the central control unit 130.

When the first domain control unit 111 transmits the DWL/ACT signal, the first domain control unit 111 may transmit the DWL/ACT signal, which is changed by a combination of signal 1. Alternatively, the lamp control unit 113 may transmit the set DWL mode to the lamp unit 115 through a combination of the DWL/ACT signal and signal 1.

Further, the user may convert the DWL mode by the communication unit 150 and newly update the DWL mode.

The set DWL mode is designated by the combination of the converted mode information and signal 1.

Further, as illustrated in FIG. 1, the system may include the first domain 110, the second domain 120, the central control unit 130, the input unit 140, and the communication unit 150.

In this case, because the local signal system in the first domain 110 receives the status signal (signal 1) of the low-level controller (the first component controller 112) bound together with the lamp unit 115 in the same domain and inputs signal 1 to the local signal system, the low-level controller needs to be bound together with the lamp unit 115 in the single domain (i.e., the first domain).

Further, the high-level control unit 131 is required to allow the local signal system in the first domain 110 to receive the status signal (signal 2) of the low-level controller (second component controller 122) that is not bound together with the lamp unit 115 in the same domain. The second component 123 and the lamp unit 115 are separated in different domains. Therefore, a necessary signal needs to be managed by the central control unit 130.

When the first domain control unit 111 transmits the DWL/ACT signal, the first domain control unit 111 may transmit the DWL/ACT signal, which is changed by a combination of signal 1. Alternatively, the lamp control unit 113 may transmit the set DWL mode to the lamp unit 115 through a combination of the DWL/ACT signal and signal 1.

Further, the user may convert the DWL mode by the signal input unit 141. The set DWL mode is designated by a combination of the converted DWL mode and signal 1.

Further, the user may convert the DWL mode by the communication unit 150 and update the DWL mode.

The set DWL mode is designated by the combination of the converted mode information and signal 1.

Figure 13:
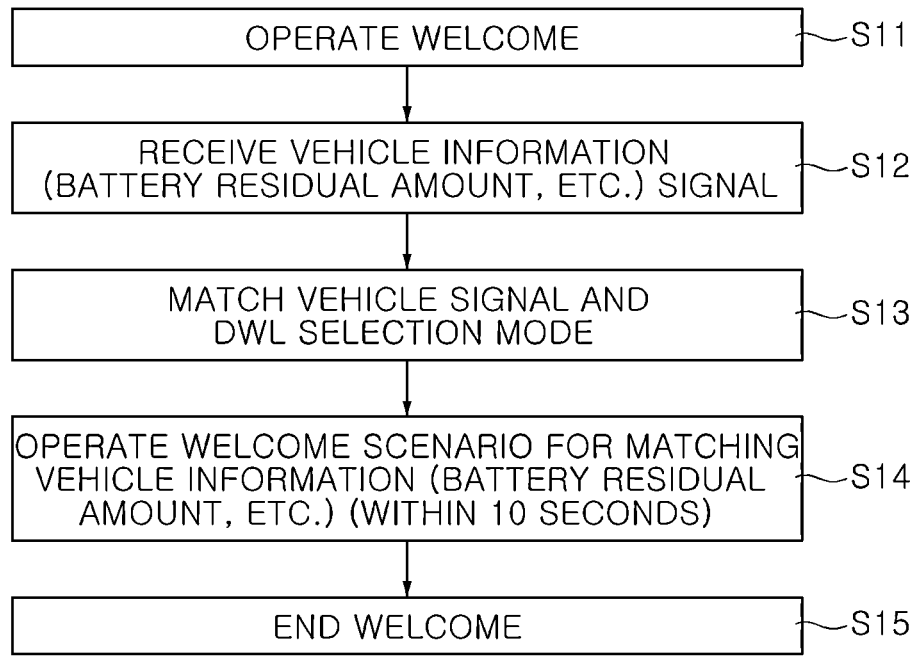
FIG. 13 is a view illustrating an embodiment of a vehicle condition check light control method using a DWL mode of the present disclosure.

Next, FIG. 13 is a view illustrating an embodiment of a vehicle condition check light control method using a DWL mode of the present disclosure.

First, when a DWL signal operation condition is satisfied, a welcome mode is operated (S11) and a vehicle condition information signal is received (S12).

In addition, whether the light source, which constitutes the lamp unit 115, is normally turned on may be inspected. In other words, the inspection is performed by performing control to turn on an individual light source or two or more light sources. In this case, a turn-on frequency may not exceed 2 Hz in order to prevent confusion.

The operation condition of the DWL mode needs to be a state in which a welcome (or escort) setting is activated on a vehicle user setting menu (USM), a vehicle door is locked (all locked & closed), the vehicle is turned off, and the user is positioned outside the vehicle and has a key.

In addition, the operation condition of the DWL mode may be a case in which a multi-functional switch may be positioned at AUTO or UNLOCK is performed once (in consideration of two-turn setting activation) through a smart key (SMK), a free on board (FOB), and a remote keyless entry (RKE) in a state of Tail Auto Cut On.

In a case that the DWL operation condition is not satisfied or the selection mode information is the welcome mode, the lamp control unit 113 controls the lamp unit 115 in the welcome mode based on the selection mode information.

However, in case that the selection mode information is the DWL mode and the DWL operation condition is satisfied, the lamp control unit 113 receives the selection mode information and the DWL operating signal from the high-level control unit 131 and the first domain control unit 111, receives signal 1 and signal 2 (S12), and controls the lamp unit 115 in the DWL mode.

In other words, the lamp control unit 113 matches signal 1, signal 2, and the DWL selection mode information (S13), generates the set DWL mode, and controls the lamp unit 115 by the set DWL mode (S14).

As a result, a welcome scenario for matching the set DWL mode is operated (within 10 seconds).

Thereafter, the DWL mode is ended when a predetermined DWL signal stop condition is satisfied (S15).

The stop condition is a case in which the multi-functional switch is not positioned at AUTO, Tail Auto Cut is in an Off state, and an unlocking or locking manipulation is performed in case that the welcome (or escort) setting is deactivated or ignition 1 (IGN1) and ignition 2 (IGN2) are manipulated on the vehicle user setting menu (USM).

The time is initialized when the DWL signal is operated again after the DWL signal is stopped.

Figure 14:
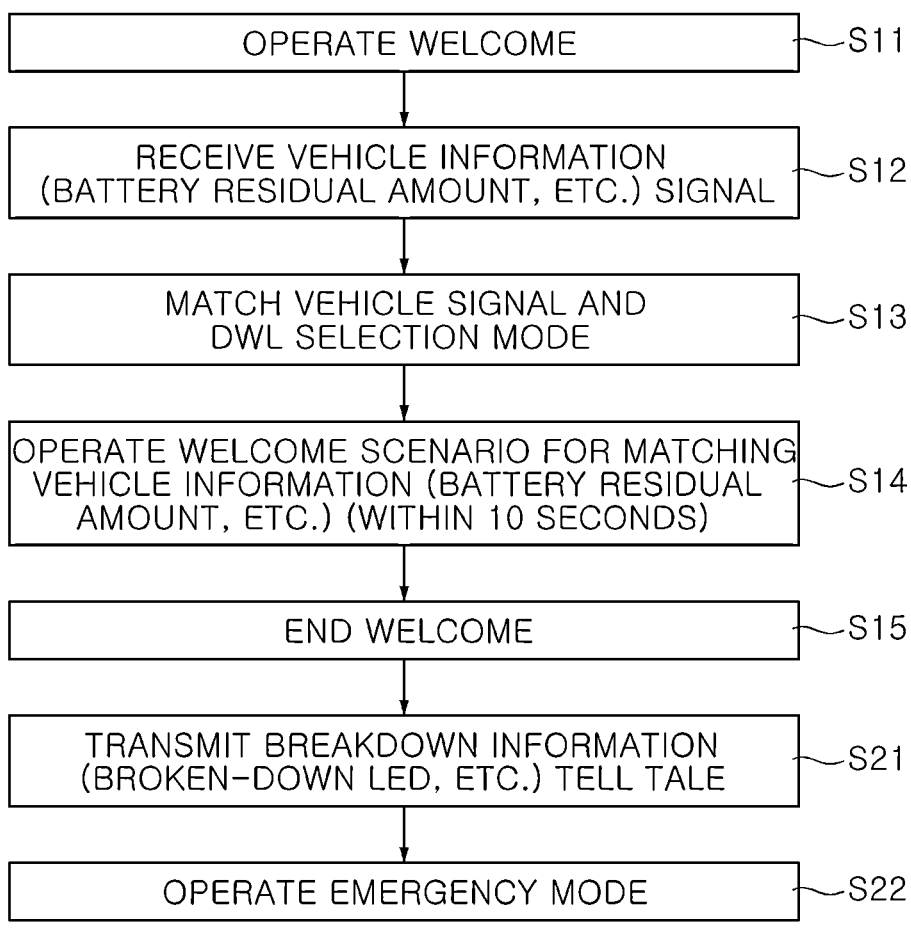

Next, FIG. 14 is a view illustrating an application embodiment of FIG. 13 and illustrating a step made after the end of the welcome mode (S15).

Even after the end of the welcome mode (S15), breakdown information of the components essential to vehicle traveling is identified, and TELL-TALE is transferred when the breakdown occurs (S21).

Examples of the representative breakdown information identification component include a lamp, a battery state, a tire air pressure, and the like.

An emergency mode is operated (S22) at the time of transmitting TELL-TALE in S21. In a case that the LED is broken down when the emergency mode is operated, the lamp unit 115 may be controlled to turn on peripheral LEDs, TURN may be continuously turned on, or the periphery of the broken-down LED is turned on or off to display the broken-down LED.

Figure 15:
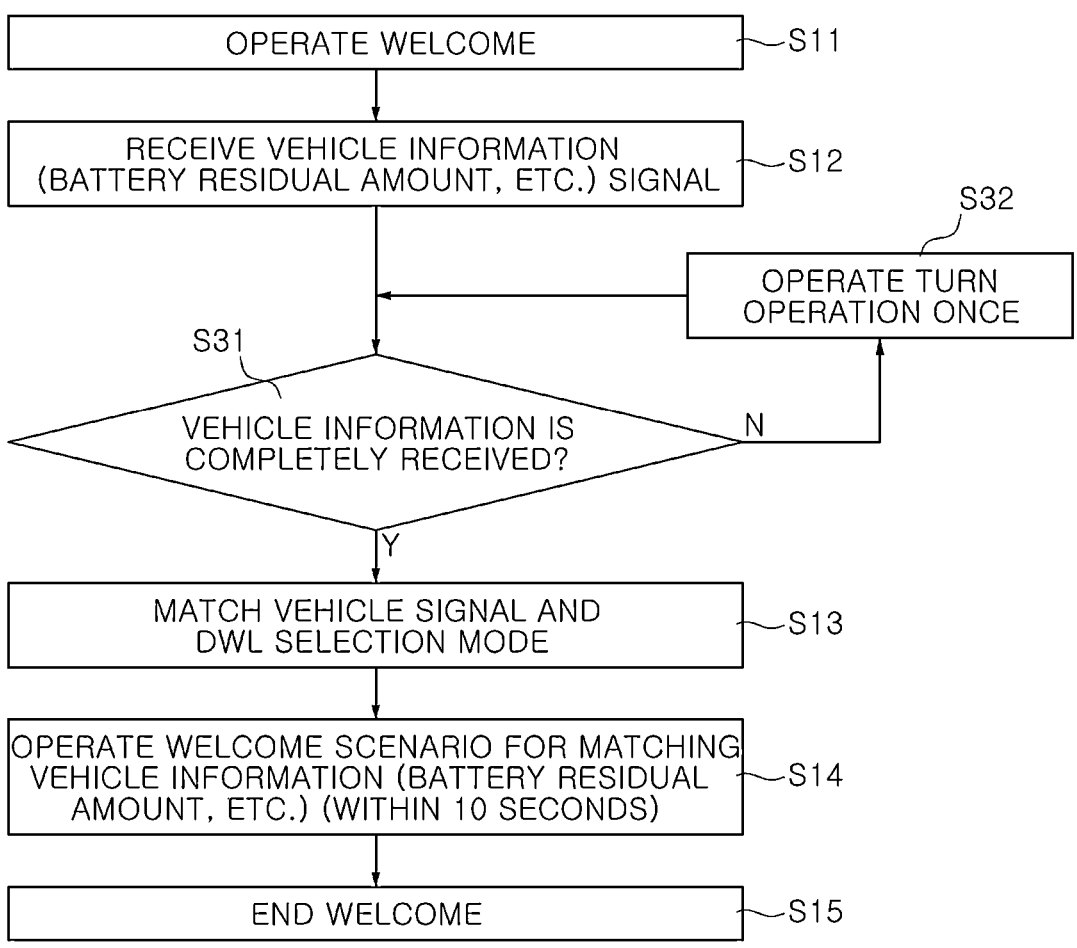
Figures 16, 17:
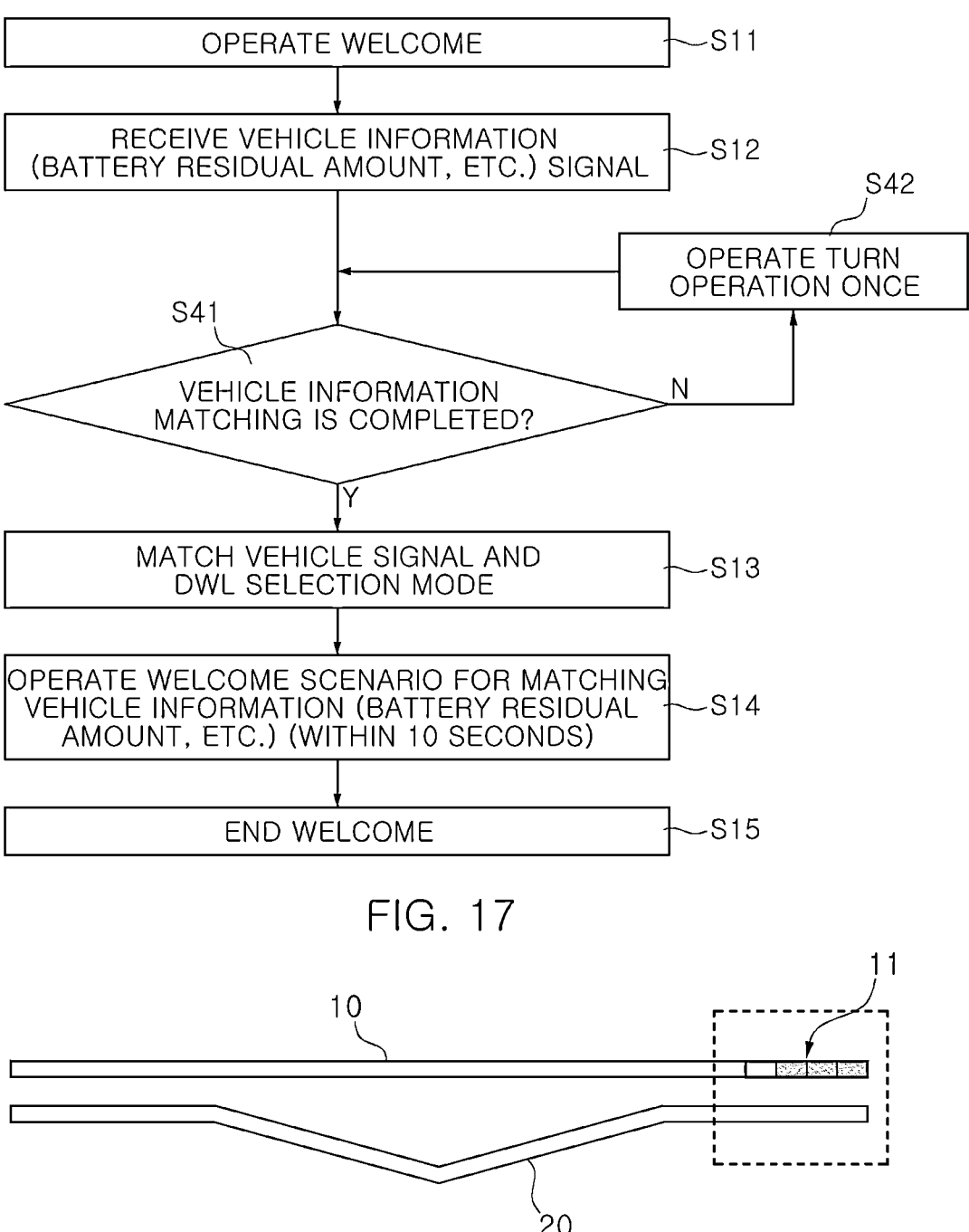

Further, FIGS. 15 and 16 are views illustrating another application embodiment of FIG. 13, i.e., an embodiment in which a turn operation is added.

First, in FIG. 15, whether the vehicle information is completely received is identified (S31) after S12. Operation S13 is performed when the identification result indicates that the vehicle information is completely received. When the identification result indicates that the vehicle information is not completely received, the turn operation is performed once (S32), i.e., the turn operation is turned on once until the vehicle information signal is completely received (S12).

Further, in FIG. 16, whether vehicle information matching is completed is identified (S41) after operation S13. Operation S14 is performed when the identification result indicates that the matching is completed. When the identification result indicates that the matching is not completed, the turn operation is performed once (S42), i.e., the turn operation is turned on once until the vehicle information signal matching S13 is completed.

Next, FIGS. 17-22 are views schematically illustrating embodiments of a vehicle condition check light according to the present disclosure.

The present disclosure is intended to display the vehicle condition when the DWL mode is operated by performing control to turn on some of the light sources of the lamp unit 115 based on the vehicle condition in the DWL operation condition.

The lamp unit 115 has a plurality of light sources arranged in particular patterns. In FIGS. 17-22, the patterns may be configured in two rows, an upper row 10 may be configured as a straight pattern, and a lower row 20 may be configured as a partially bent pattern.

FIG. 17 illustrates that a vehicle condition display unit 11 is arranged at a right side of the straight upper row 10 to display the vehicle condition. For example, a case in which all four of the light sources of the vehicle condition display unit 11 are turned on indicates that the battery residual amount is 91% or more. As illustrated, a case in which only three of the four light sources of the vehicle condition display unit 11 are turned on may indicate that the battery residual amount is 81% or more and 89% or less. Even in the case of two of the light sources or a single light source being turned on, the battery residual amount may be displayed proportionally.

Alternatively, the vehicle condition display unit 11 may be provided only at one side of the lower row 20.

Figure 18:
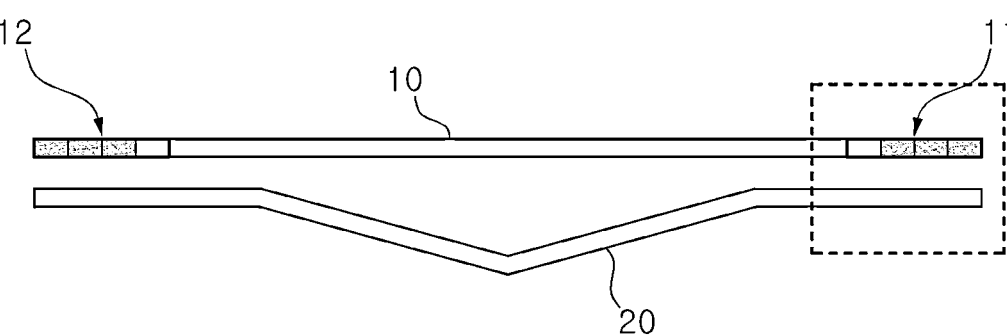
Figure 19:
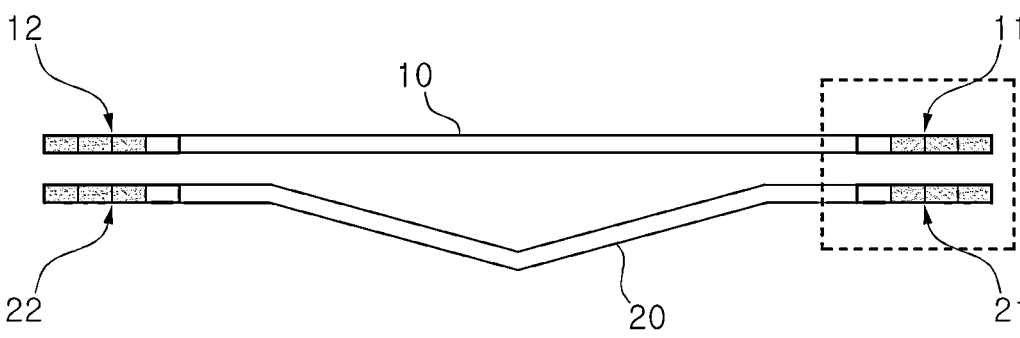

FIG. 18 illustrates a case in which the vehicle condition display units 11 and 12 are arranged at two opposite ends (i.e., left and right sides) of the straight upper row 10. FIG. 19 illustrates that the vehicle condition display units 11, 12, 21, and 22 are arranged and turned on at two opposite ends (i.e., left and right sides) of the upper and lower rows 10 and 20, respectively.

Figure 20:
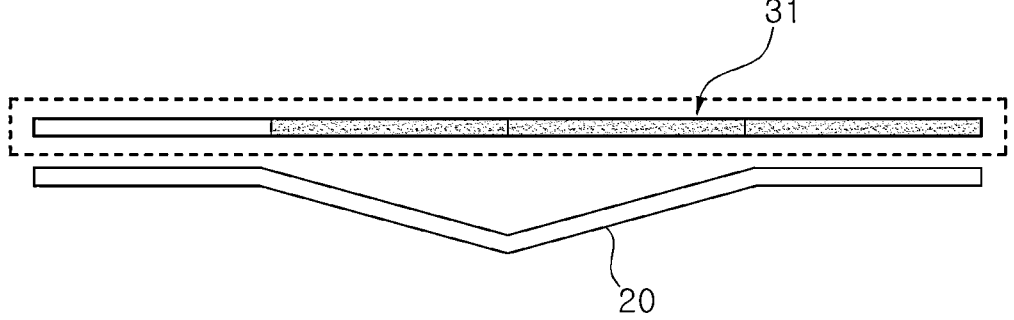

In addition, as illustrated in FIGS. 20 and 21, the vehicle condition display unit 31 or 41 may be arranged in the entire upper row 10, such that the user may recognize the vehicle condition by turning on a partial region among the regions made by equally dividing the entire upper row 10. Alternatively, the vehicle condition display units may be configured only in the entire lower row 20.

FIG. 22 illustrates that the vehicle condition display units 41, 42 are arranged in the entire upper and lower rows 10 and 20, respectively, so that partial regions may be turned on among the regions made by equally dividing the upper and lower rows 10 and 20.

In other words, a single lamp or a combination of one or more lamps in the regions corresponding to the vehicle condition display units 11 may be used as daytime running lights (DRL), position lights (POSITION), low beam headlights (LOW), high beam headlights (HIGH), turn signal lights (TURN), tail lights (TAIL), brake or stop lights (STOP), and high-mounted stop lamp (HMSL).

Next, FIGS. 23-30 are views illustrating operating states of various embodiments of the vehicle condition check light according to the present disclosure.

First, as illustrated in FIG. 23, some of the lamp units in the particular patterns may be the vehicle condition display units 101. Among the lamp units, the identical light sources are turned on. For example, the light sources having different colors from those in the general welcome operation are turned on to display different colors.

Figure 24:
Figure 25:
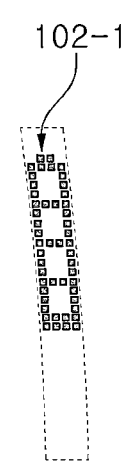

FIG. 24 illustrates a state in which lamp units 102, in a welcome operating state, are turned on by the DWL operation. In these lamp unit shapes, only the light sources of vehicle condition display units 102-1 are turned on to display the vehicle condition in the DWL mode, as illustrated in FIG. 25.

Figure 26:
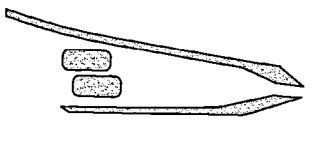
Figure 26:
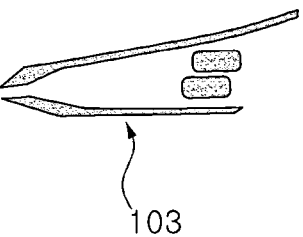
Figure 27:
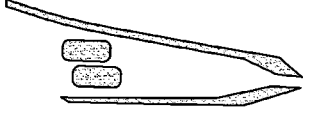
Figure 27:
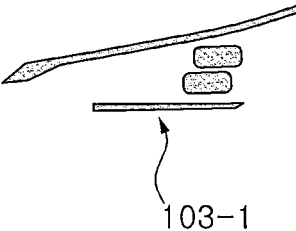

Further, FIG. 26 illustrates a state in which lamp units 103, arranged in particular patterns during welcome operating states, are turned on by the DWL operation. In these lamp unit shapes, some of the light sources of lamp units 103 are turned on as vehicle condition display units 103-1 to display the vehicle condition in the DWL mode, as illustrated in FIG. 27.

Figure 28:
Figure 29:
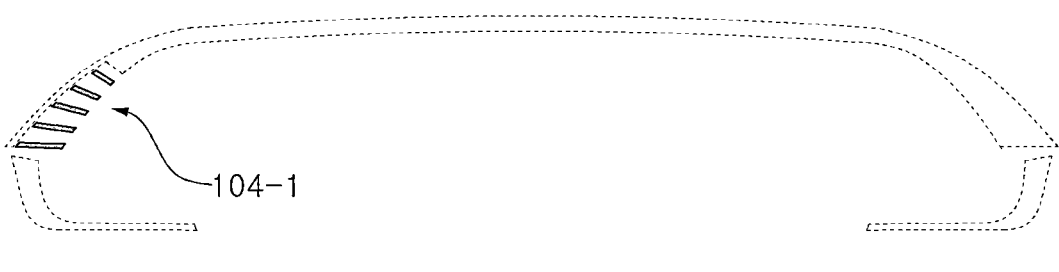

Next, FIG. 28 also illustrates a state in which lamp units 104, arranged in particular patterns during welcome operating states, are turned on by the DWL operation. In this state in which the lamp units are turned on, some of the light sources of the lamp units 104 are turned on as vehicle condition display units 104-1 to allow the user to recognize the vehicle condition in the DWL mode, as illustrated in FIG. 29.

Figure 30:
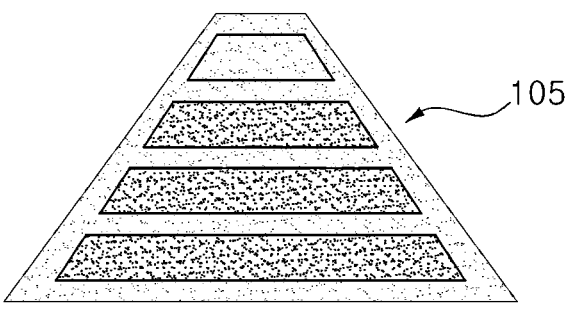
Figure 31:
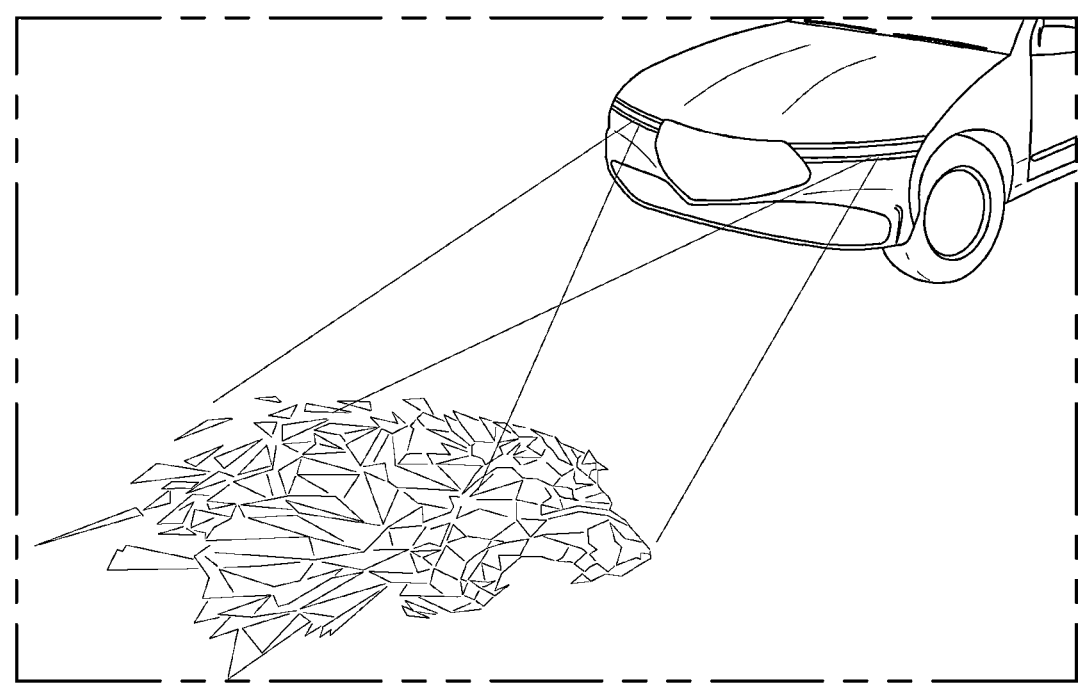

FIGS. 30 and 31 illustrate that separate exterior lamps are used instead of the above-mentioned lamp units. FIG. 30 illustrates that a pattern (light carpet) of a shape of a road surface may be displayed by the exterior lamps. FIG. 31 illustrates that welcome & good-bye functions may be implemented as particular images to be displayed on the road surface by the exterior lamps. Even in this case, some of the light sources or lamp units for displaying the general light carpet may be turned on as vehicle condition display units 105 by the present disclosure to allow the user to recognize the vehicle condition.

According to the present disclosure described above, the lamp units in particular patterns are turned on in the DWL mode, and then the vehicle condition display units are sequentially turned on. As a result, the user may recognize, in advance, the vehicle condition from the outside before the user gets in the vehicle.

While embodiments of the present disclosure have been described with reference to the drawings, it should be apparent to those having ordinary skill in the art that the present disclosure is not limited to the aforementioned embodiments. Additionally, the aforementioned embodiments may be variously changed and modified without departing from the spirit and the scope of the present disclosure. Accordingly, the changed or modified examples belong to the claims of the present disclosure and the scope of the present disclosure should be interpreted based on the appended claims.

What is claimed is:

1. A system for controlling a vehicle condition check light by using a dynamic welcome light (DWL) mode, the system comprising:

a lamp unit provided in a vehicle and having a plurality of light sources arranged therein;

a lamp control unit configured to control an operation of turning on the lamp unit;

a first component control unit configured to receive a first state information signal of a first component and transmit the first state information signal to the lamp control unit; and a first domain control unit configured to transmit a DWL operating signal to the lamp control unit when a DWL operation condition is satisfied,

wherein the lamp control unit is configured to control the operation of turning on vehicle condition display units constituting the lamp unit according to a set DWL mode in which the DWL operating signal and the first state information signal are matched, and wherein the lamp control unit is configured to inspect whether the plurality of light sources constituting the lamp unit is normally turned on by performing control to turn on the light source at a frequency of 2 Hz or lower.

2. The system of claim 1, wherein the lamp control unit is configured to perform control to selectively turn on each vehicle condition display unit of the vehicle condition display units.

3. The system of claim 1, wherein the lamp control unit inspects whether the plurality of light sources constituting the lamp unit is normally turned on before the lamp control unit performs control to turn on a respective vehicle condition display unit of the vehicle condition display units.

4. The system of claim 1, wherein the DWL operation condition is generated when a DWL operation condition is satisfied in a vehicle-turned-off condition.

5. The system of claim 1, wherein the set DWL mode is a mode in which a turn-on state of the vehicle condition display units is set in advance in a stepwise manner to correspond to a state of the first component by the first state information signal.

6. The system of claim 5, wherein the lamp control unit performs control to turn on all or a portion of the plurality of light sources of the vehicle condition display units according to the set DWL mode.

7. The system of claim 1, further comprising:

a signal input unit configured to input a DWL selection mode for selecting the DWL mode for controlling the operation of turning on the vehicle condition display units; and a high-level control unit configured to receive the DWL selection mode and transfer selection mode information of the DWL mode to the lamp control unit.

8. The system of claim 1, further comprising:

an external server configured to receive DWL information including the DWL mode for controlling the operation of turning on the vehicle condition display units and transfer the DWL information; and a high-level control unit configured to receive the DWL information from the external server and transfer selection mode information of the DWL mode to the lamp control unit.

9. The system of claim 1, further comprising:

a second component control unit configured to receive a second state information signal of a second component; and a high-level control unit configured to receive the second state information signal from the second component control unit and transmit the second state information signal to the lamp control unit, wherein the lamp control unit is configured to control the operation of turning on the vehicle condition display units, which are a portion of the light sources constituting the lamp unit, according to the set DWL mode in which the DWL operating signal, the first state information signal, and the second state information signal are matched.

10. A system for controlling a vehicle condition check light by using a dynamic welcome light (DWL) mode, the system comprising:

a lamp unit provided in a vehicle and having a plurality of light sources arranged therein;

a lamp control unit configured to control an operation of turning on the lamp unit;

a first component control unit configured to receive a first state information signal of a first component and transmit the first state information signal;

a high-level control unit configured to receive the first state information signal and transmit the first state information signal to the lamp control unit; and a first domain control unit configured to transmit a DWL operating signal to the lamp control unit when a DWL operation condition is satisfied, wherein the lamp control unit is configured to receive selection mode information, which is a turn-on control mode of the lamp unit, from the high-level control unit and to control an operation of turning on vehicle condition display units, which are a portion of the light sources constituting the lamp unit, according to a set DWL mode in which the DWL operating signal and the first state information signal are matched, and wherein the lamp control unit is further configured to inspect whether the plurality of light sources constituting the lamp unit is normally turned on by performing control to turn on the light source at a frequency of 2 Hz or lower.

11. The system of claim 10, wherein the DWL operation condition is generated when a DWL operation condition is satisfied in a vehicle-turned-off condition.

12. The system of claim 10, wherein the set DWL mode is a mode in which a turn-on state of the vehicle condition display units is set in advance in a stepwise manner to correspond to a state of a first component by a first state information signal.

13. The system of claim 10, further comprising:

a signal input unit configured to input a DWL selection mode for selecting the DWL mode for controlling the operation of turning on the vehicle condition display units, wherein the high-level control unit receives the DWL selection mode and transmits the DWL selection mode to the lamp control unit.

14. The system of claim 10, further comprising:

an external server configured to receive DWL information including the DWL mode for controlling the operation of turning on the vehicle condition display units and to transfer the DWL information, wherein the high-level control unit receives the DWL information from the external server and transfers selection mode information of the DWL mode to the lamp control unit.

15. The system of claim 10, further comprising:

an external lamp mounted in the vehicle independently of the lamp unit, wherein the high-level control unit is configured to control an operation of turning on the external lamp to correspond to a state of the first component by the first state information signal.

* * * * *